United States Patent [19]
Nakayama et al.

[11] Patent Number: 5,967,057
[45] Date of Patent: Oct. 19, 1999

[54] SYNTHETIC RESIN PALLET

[75] Inventors: Tsutomu Nakayama; Satoshi Ishido; Yuzo Hayakawa, all of Ueda, Japan

[73] Assignees: Nippon Plapallet Company, Ueda; Dainippon Ink and Chemicals, Inc.; Mitsubishi Chemical Corporation, both of Tokyo, all of Japan

[21] Appl. No.: 08/963,864

[22] Filed: Nov. 4, 1997

[30] Foreign Application Priority Data

| Nov. 5, 1996 | [JP] | Japan | 8-292925 |
| Dec. 9, 1996 | [JP] | Japan | 8-328934 |
| Jan. 31, 1997 | [JP] | Japan | 9-019490 |
| Jul. 28, 1997 | [JP] | Japan | 9-202009 |
| Jul. 28, 1997 | [JP] | Japan | 9-202010 |

[51] Int. Cl.$^6$ ................................ B65D 19/00
[52] U.S. Cl. .................... 108/57.25; 108/57.26
[58] Field of Search ............. 108/57.25, 57.26, 108/57.27, 57.28, 901, 902

[56] References Cited

U.S. PATENT DOCUMENTS

| 3,938,448 | 2/1976 | Nishitani et al. | 108/57.26 |
| 4,013,021 | 3/1977 | Steinlein et al. | 108/57.25 |
| 4,051,787 | 10/1977 | Nishitani et al. | 108/901 X |
| 4,287,836 | 9/1981 | Aoki | 108/57.25 |
| 5,401,459 | 3/1995 | Nichols et al. | |
| 5,579,686 | 12/1996 | Pigott et al. | 108/902 X |

FOREIGN PATENT DOCUMENTS

| 0 583 796 | 2/1994 | European Pat. Off. |
| 2 310 277 | 12/1976 | France |
| 93 14 468 | 3/1995 | Germany |
| 1 293 431 | 10/1972 | United Kingdom |

*Primary Examiner*—Jose V. Chen
*Attorney, Agent, or Firm*—Oblon, Spivak, McClelland, Maier & Neustadt, P.C.

[57] ABSTRACT

A synthetic resin pallet including a top board, a bottom board disposed opposite to the top board, and a plurality of cylindrical blocks for connecting the two boards. A fork entry port is formed between the blocks. The synthetic resin pallet is manufactured by making one pallet constructive member and another pallet constructive member face to each other. The one pallet constructive member includes the board and cylindrical block constructive members integrally formed on the inside of the board. The other pallet constructive member includes the board and block constructive member integrally formed on the inside of the board. Reinforcing ribs are formed lengthwise and crosswise on the inside of the surface of at least one pallet constructive member. The reinforcing ribs include surface reinforcing ribs formed lengthwise and crosswise on the inside of the surface of the synthetic resin pallet. Hollowed portions are formed in inner parts of at least some of the surface reinforcing ribs.

24 Claims, 17 Drawing Sheets

SYNTHETIC RESIN PALLET

BACKGROUND OF THE INVENTION

1. Field of the Invention

The present invention relates generally to a synthetic resin pallet and, more particularly, to a pallet for a forklift used when transporting, moving and storing articles.

2. Description of the Related Art

A synthetic resin pallet has hitherto been manufactured as a pallet for a forklift. Normally, this kind of synthetic resin pallet is basically is constructed by forming two pallet constructive members by injection molding and making these pallet constrictive members integral with each other.

To be specific, each of the two pallet constructive members formed by the injection molding includes a board, block (foot) constructive members provided in adequate positions on the inside of the board, and reinforcing ribs provided intersecting lengthwise and crosswise on the inside of this board. The synthetic resin pallet is manufactured by making these pallet constructive members face to each other, matching the block constructive members with each other and integrally welding the matched portions thereof. In this construction, the welded block constructive members serve as the blocks (feet) of the synthetic resin pallet, and a space between these blocks serves as a fork entry port.

It is a well-known fact that the formation of such reinforcing ribs on the inner surface of the board of each pallet constructive member is extremely effective in terms of enhancing a flexural strength of the board and preventing an occurrence of flexure on the board when transporting and moving a load with the forklift.

The above-described reinforcing ribs exhibit a large effect in terms of increasing the flexural strength of the board as described above. While on the other hand, however, there arises a problem in which a weight of the synthetic resin pallet increases correspondingly. Hence, there has been contrived a method of reducing the weight of the whole by hollowing those reinforcing ribs while enhancing the board flexural strength. This type of synthetic resin pallet is disclosed in Japanese Patent Application Laid-Open Publication No.5-162751.

Incidentally, the above-described prior art synthetic resin pallet acquired a high evaluation because of the board flexural strength being very large owing to the hollowed reinforcing ribs but lighter in weight than the conventional products.

The hollowed reinforcing ribs is not, however, so strong against an impact although large in terms of the flexural strength. Accordingly, the reinforcing ribs peripheral to the port area of the fork entry port of the synthetic resin pallet present a problem in terms of a durability of the synthetic resin pallet, wherein if mistakenly collided with the fork just when the fork is inserted, the hollowed reinforcing ribs are liable to be broken by the impact.

Further, the prior art synthetic resin pallet has, in addition to the problems given above, a problem in which the portions adjacent to the port area of the fork entry port, in other words, block edge portions on both sides of the port area of the fork entry port are also liable to be damaged by the collision with the fork, and, when it happens that the block edge portions on both sides are damaged even if the strength of the port area of the fork entry port is enhanced, the durability of the pallet as a whole can not be increased.

SUMMARY OF THE INVENTION

It is a primary object of the present invention to provide a synthetic resin pallet capable of protecting reinforcing ribs peripheral to a port area of a fork entry port from being broken by an impact while being light in weight and having a large flexural strength, and therefore exhibiting a high durability.

It is another object of the present invention to provide a synthetic resin pallet capable of protecting the reinforcing ribs of the port area of the fork entry port and block edge portions adjacent to the port area of the fork entry port from being broken by an impact of a fork while being light in weight and having the large flexural strength, and therefore exhibiting the high durability.

It is still another object of the present invention to provide a synthetic resin pallet capable of eliminating a possibility of forming a recess in a board located just above a reinforcing rib when this reinforcing rib is provided on the inside of the board.

It is a further object of the present invention to provide a synthetic resin pallet capable of educing its weight while increasing a strength of blocks as a whole and, besides, restraining a manufacturing cost.

It is a still further object of the present invention to provide a synthetic resin pallet capable of having a well-balanced gas introduction when forming hollowed portions by introducing a gas into reinforcing ribs s that the pallet is light in weight and has the large flexural strength.

To accomplish the objects given above, according to one aspect of the present invention, a synthetic resin pallet comprises a top board mounted mainly with a load, a bottom board disposed opposite to this top board, a plurality of cylindrical blocks for connecting these two boards, and a fork entry port formed between these blocks. This synthetic resin pallet is manufactured by making, face to each other, one pallet constructive member including the board and cylindrical block constructive members integrally formed on the inside of this board, and another pallet constructive member including the above board and block constructive member integrally formed on the inside of this board, and by integrally welding the block constructive members. Reinforcing ribs are formed lengthwise and crosswise on the inside of the surface of at least one pallet constructive member, and include hollowed surface reinforcing ribs formed lengthwise and crosswise on the inside of the surface of the synthetic resin pallet.

In the reinforcing ribs defined as vital components for constituting the present invention, the surface reinforcing ribs extending in a direction orthogonal to a longitudinal direction of the fork entry port are hollowed, and the surface reinforcing ribs parallel to the longitudinal direction of the fork entry port are solid.

Furthermore, this reinforcing rib includes a solid edge reinforcing rib formed along an edge of the port area of the fork entry port of the synthetic resin pallet. This edge reinforcing rib is connected to the hollowed surface reinforcing rib along and adjacently to this reinforcing rib through a plurality of solid connection ribs disposed at a predetermined interval.

Moreover, in the synthetic rein pallet according to the present invention, a plurality of blocks are provided at the central portion of the synthetic resin pallet and are constructed of a central block formed with a closed space in its interior and peripheral blocks provided at a predetermined interval along the periphery of the central block. The interior of the central block is formed with gas flowing ribs formed radially from the central portion, and the hollowed portion is formed in the reinforcing rib by blowing a gas from inside of the central block constructive member which will become the central block and flowing the gas into the comparatively thick surface reinforcing rib provided in the pallet constructive member through the gas flowing rib when molding the pallet constructive member.

In addition, in the synthetic resin pallet according to the present invention, the block is constructed so as to include a comparatively small closed spatial portion for dividing the internal space of the block in an interior of the edge portion adjacent to the port area of the fork entry port.

Moreover, in the synthetic resin pallet according to the present invention, an interior of the block constructive member provided in the pallet constructive members constituting the synthetic resin pallet is formed with reinforcing structural portions, and at least one of the reinforcing structural portions is constructed of an annular post and a radial reinforcing rib extending radially from an outer periphery of this annular post and connected to an internal surface of the block constructive member.

In the synthetic resin pallet according to the present invention, a wall thickness of the above block is set to approximately 3 mm–7 mm, and a width of the hollowed surface reinforcing rib is set to approximately 8 mm–40 mm. It is desirable that the width of the solid surface reinforcing rib be smaller than the width of the hollowed surface reinforcing rib in terms of particularly reducing a weight, holding a predetermined flexural strength and enhancing strength of a portion peripheral to the fork entry port against an impact.

The synthetic resin pallet of the present invention is, on the whole, manufactured by molding the two pallet constructive members by injection molding, making these two pallet constructive members face to each other and integrally welding them. When each pallet constructive member is molded by the injection molding, the interiors of the reinforcing ribs are hollowed by introducing the gas from a predetermined position before the interiors of the reinforcing ribs provided lengthwise and crosswise on the internal surface of a deck board are solidified.

However, the edge reinforcing rib formed at the edge along the port area of the fork entry port in this synthetic resin pallet, is designed to have a small width dimension, and therefore the gas introduced into the thick surface reinforcing rib does not permeate the edge reinforcing rib. As a result, the edge reinforcing rib becomes solid.

The solid edge reinforcing rib has a high strength against the impact and is not therefore easily broken even if the fork mistakenly collides with the edge reinforcing rib when the fork is inserted into the fork entry port, and consequently a durability of the synthetic rein pallet can be improved.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
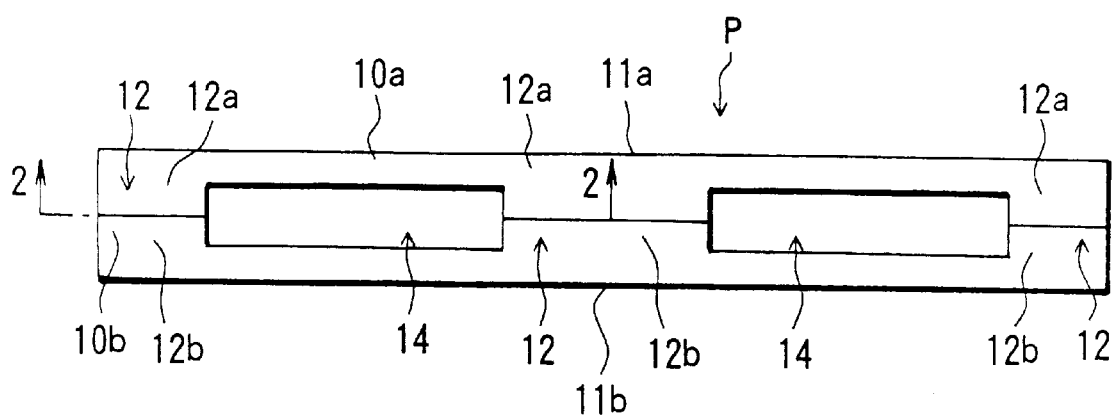
FIG. 1 is a side view illustrating a four-way synthetic resin pallet in a first embodiment of the present invention.

Illustrative embodiments of a synthetic resin pallet according to the present invention will hereinafter be described in greater detail with reference to the drawings. FIG. 1 shows a side surface of a synthetic resin four-way pallet P in accordance with a first embodiment of the present invention. This synthetic resin pallet P includes a top board 11a mounted mainly with a load, a base board 11b provided opposite to the top board 11a, a plurality of cylindrical blocks 12 for connecting the two boards, and fork entry ports 14 formed between these blocks 12.

The synthetic resin pallet P is constructed of two pallet constructive members 10a, 10b. One pallet constructive member 10a includes the board 11a mounted chiefly with the load, and a cylindrical block constructive member 12a integrally formed inside the board 11a. Further, the other pallet constructive member 10b includes the board 11b and a block constructive member 12b formed integrally inside the board 11b. In accordance with the first embodiment, it is desirable that each of the block constructive members 12a, 12b should take a cylindrical shape and be formed as thin as approximately 3–7 mm.

The synthetic resin pallet P is manufactured by setting these two pallet constructive members 10a, 10b in a face-to-face relationship and integrally welding these members to each other. The thus welded block constructive members 12a, 12b are formed into a block 12 of the synthetic resin pallet P, and a space between these blocks 12 serves as the fork entry port 14.

Figure 3:
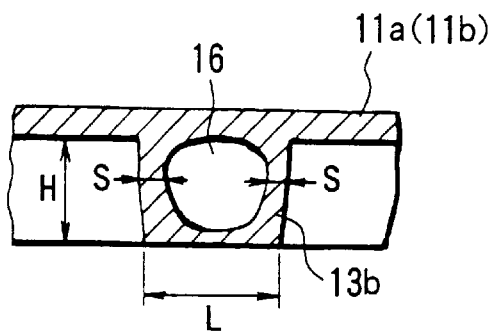
FIG. 3 is sectional view showing a hollowed reinforcing rib when cutting the pallet constructive member along the line 3—3 shown in FIG. 2.

A multiplicity of reinforcing ribs 13 are formed lengthwise and crosswise on the insides of the boards 11a, 11b of the pallet constructive members 12a, 12b. Each of the reinforcing ribs 13 provided intersecting crosswise and lengthwise on the insides of the pallet constructive members 10a, 10b, is constructed of a solid edge reinforcing rib 13a and a surface reinforcing rib 13b. The former edge reinforcing ribs 13a are formed along port areas 14a of the fork entry ports 14 at inner edges of the boards 11a, 11b. In accordance with the first embodiment, all the surface reinforcing ribs 13b include hollowed portions 16 formed therein as shown in FIG. 3.

The solid edge reinforcing ribs 13a formed along the port areas 14a of the fork entry ports 14 at the edges thereof, are connected to the hollowed surface reinforcing ribs 13b formed in parallel thereto and adjacent thereto via a multiplicity of connection reinforcing ribs 13c provided at predetermined intervals. This connection reinforcing rib 13c is also solid. Thus, the solid edge reinforcing ribs 13a are connected to the adjacent hollowed surface reinforcing ribs 13b through the plurality of connection reinforcing ribs 13c, whereby a strength against an impact on the edge reinforcing rib 13a can be further enhanced.

It is desirable that a width dimension L f the hollowed surface reinforcing rib 13b be set larger by 2 mm or above than a width of the solid reinforcing rib, and is therefore approximately 5–40 mm and, preferably, 8–20 mm. Further, a height H of the hollowed surface reinforcing rib 13b (a height from the inner surfaces of the boards 11a, 11b) falls within a range of approximately 10–50 mm and, preferably, 15–40 mm). Note that a thickness of the solid edge reinforcing rib 13a is set preferably to 3–7 mm.

Now, the following is one method of making the surface reinforcing ribs 13b hollow, which are formed inwardly of the boards 11a, 11b. Reinforcing rib molding parts of a mold for molding the pallet constructive members 10a, 10b, are designed to mold the reinforcing ribs having the above-described dimensions, and the mold are formed with a plurality of gates.

Figure 2:
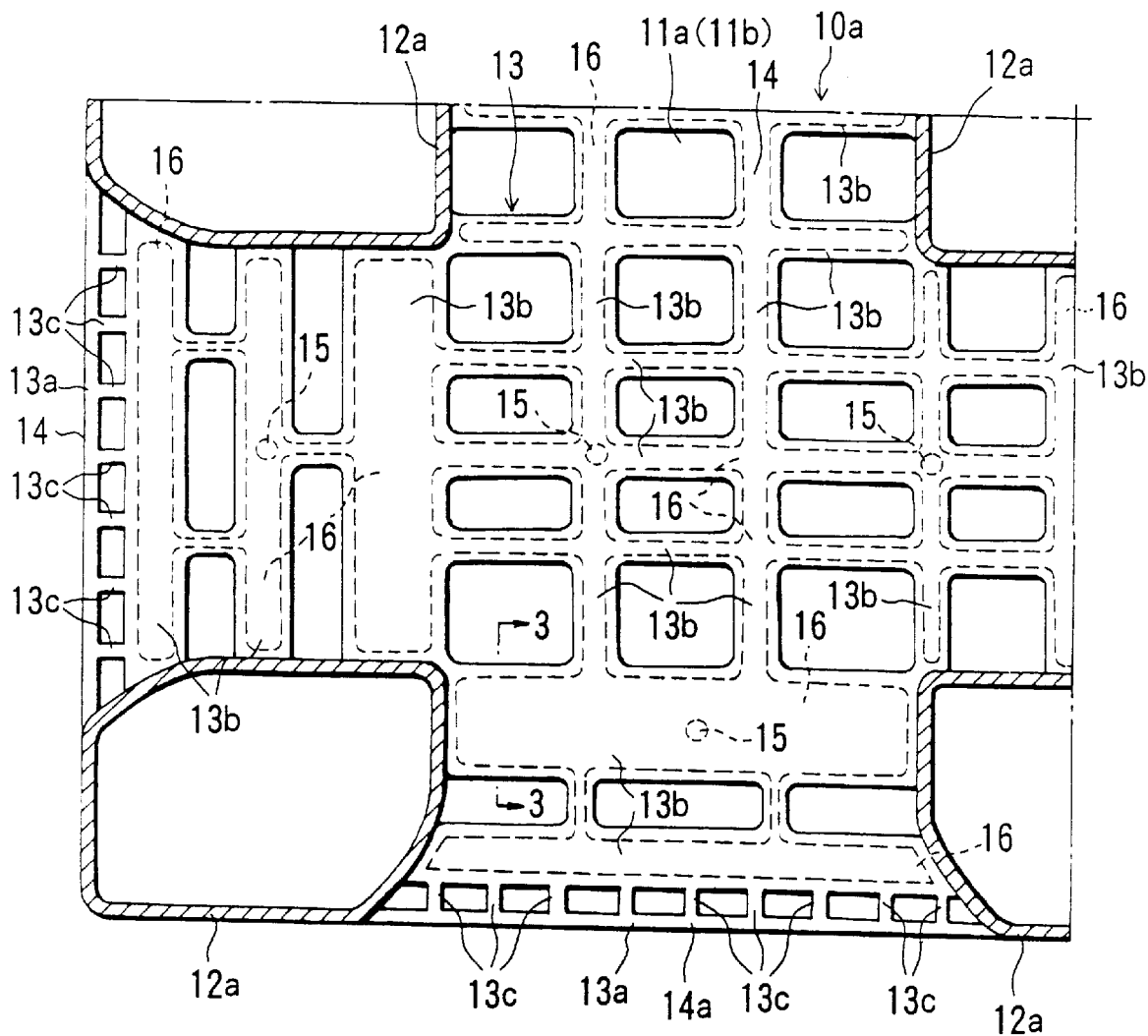
FIG. 2 is a plan view of a one-fourth part, as viewed from inside, of one of two pallet constructive members constituting the four-way synthetic resin pallet shown in FIG. 1.

When injection-molding the pallet constructive members 10a, 10b by pouring the molten resin from the gates of the mold, before the inner parts of the surface reinforcing ribs 13b of the reinforcing ribs 13 are solidified, an adequate gas such as air or nitrogen is introduced from the molten resin pouring holes or separately formed gas-only introducing holes. Referring to FIG. 2, a mark of the gas introducing hole serving as the molten resin pouring hole in the surface reinforcing rib 13b of each of the pallet constructive members 10a, 10b after being molded, is indicated by the numeral 15.

As described above, when molded by injecting the molten resin into the mold, the method of forming the hollowed portion by blowing the gas therein before the molten resin poured into the mold is solidified, is well known as a gas-assisted injection molding method, and hence a detailed explanation of this method will be omitted. An internal pressure of the gas blown into the surface reinforcing rib 13b of the reinforcing rib 13 acts evenly upon an inner wall of the die assembly part, and therefore, as illustrated in FIG. 3, a wall thickness S of the molded surface reinforcing rib 13b is substantially fixed and is never extremely ununiform. Thus, the hollowed portions 16 are formed within the surface reinforcing ribs 13b, thereby making it feasible to decrease a weight of the synthetic resin pallet P and a molding time as well.

A quantity of the gas introduced into the surface reinforcing ribs 13b of the pallet constructive members 10a, 10b is controlled by a necessary strength etc of the synthetic resin pallet. Normally, it is desired that the gas be introduced so that an apparent density of the synthetic resin pallet as a whole is 0.75–0.9 time as small as a density of a raw synthetic resin.

Incidentally, the hollowed surface reinforcing rib 13b constituting the reinforcing rib 13, the solid edge reinforcing rib 13a and the connection reinforcing rib 13c are all connected. Accordingly, it could be considered that a hollowed portion might be formed because of the introduced gas flowing to the solid edge reinforcing rib 13a and also the connection reinforcing rib 13c. The gas introduced into the die assembly does not, however, flow into the rib having a wall thickness smaller than a predetermined wall thickness. Accordingly, as far as the edge reinforcing ribs 13a and the connection reinforcing rib 13c are formed so that the widths, i.e., the wall thicknesses thereof fall within a range of approximately 3–7 mm, there must be formed not the hollowed but solid portion.

Note that injection molding conditions of the pallet constructive members 10a, 10b may be normal conditions. For example, when high-density polyethylene is used as a material, it is desirable that a melting temperature (a cylinder temperature) be 200–250° C., and an injection rate be on the order of 2000–5000 cc/sec. Further, typical synthetic resins of which the pallet is composed may be polyolefine such as polyethylene, polypropylene and ethylene-propylene copolymer etc. As the case may be, however, other resins may be employed as a matter of course.

It should be also taken for granted that additive agents such as coloring agents and fillers etc may be properly used. Moreover, a hitherto-known foaming agent containing a normally used organic or inorganic agent is mixed in the above synthetic resin, and a formed body may be thus obtained. It is desirable that a foaming rate in this case be 1.05–1.4 times. In such a case, the apparent density of the whole pallet may be preferably 0.65–0.9 time as small as the density of the raw synthetic resin.

Figure 4:
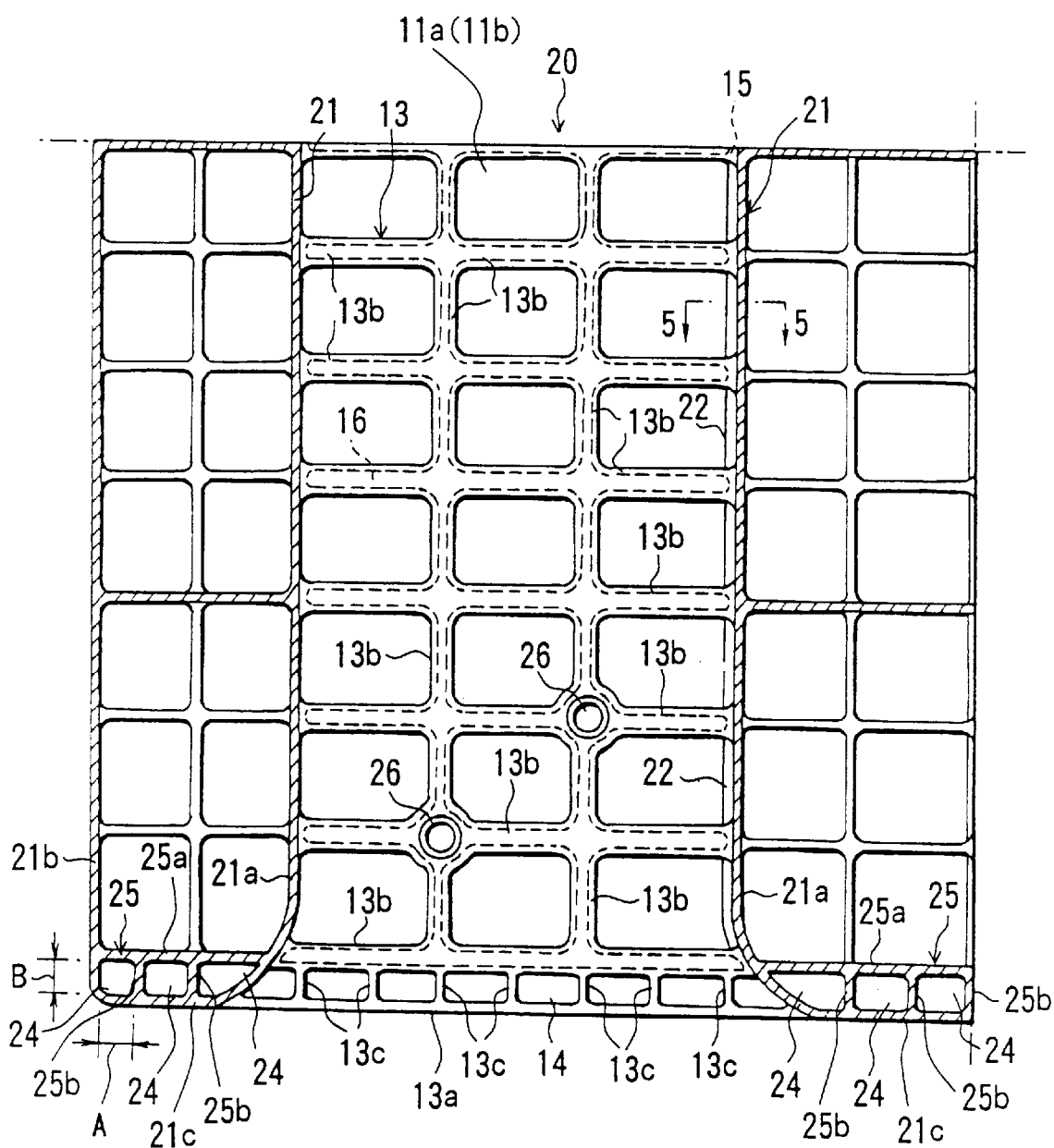
FIG. 4 is a plan view of a one-fourth part, as viewed from inside, of one of two pallet constructive members constituting a two-way synthetic resin pallet in a second embodiment of the present invention.

FIG. 4 shows one-fourth of one of two pallet constructive members 20 constituting a two-way synthetic resin pallet in accordance with a second embodiment of the present invention. This pallet constructive member 20 comprises the board 11a mounted mainly with the load, block constructive members 21 formed at two edge portions and a middle portion thereof on its inside, and the reinforcing ribs 13 provided intersecting lengthwise and crosswise on the inside of the board 11a. This construction is the same as the pallet constructive members 10a, 10b of the synthetic resin pallet in accordance with the first embodiment, and hence an explanation thereof is omitted while the components are marked with the same reference numerals.

When molding the pallet constructive members 20 constituting the two-way synthetic resin pallet, the following is a method of making hollow the inner parts of the surface reinforcing ribs 13b of the reinforcing ribs 13 by blowing the gas into the inner parts thereof. To be specific, the mold for molding this pallet constructive member 20 is formed with a plurality of gas introducing holes (a mark of one gas introducing hole, which appears on the board 11a of the pallet constructive member 20 after being molded, is indicated by the numeral 15 in FIG. 4) corresponding to positions on the surface 11a along the side wall of the block constructive member 21 located at the center.

Figure 5:
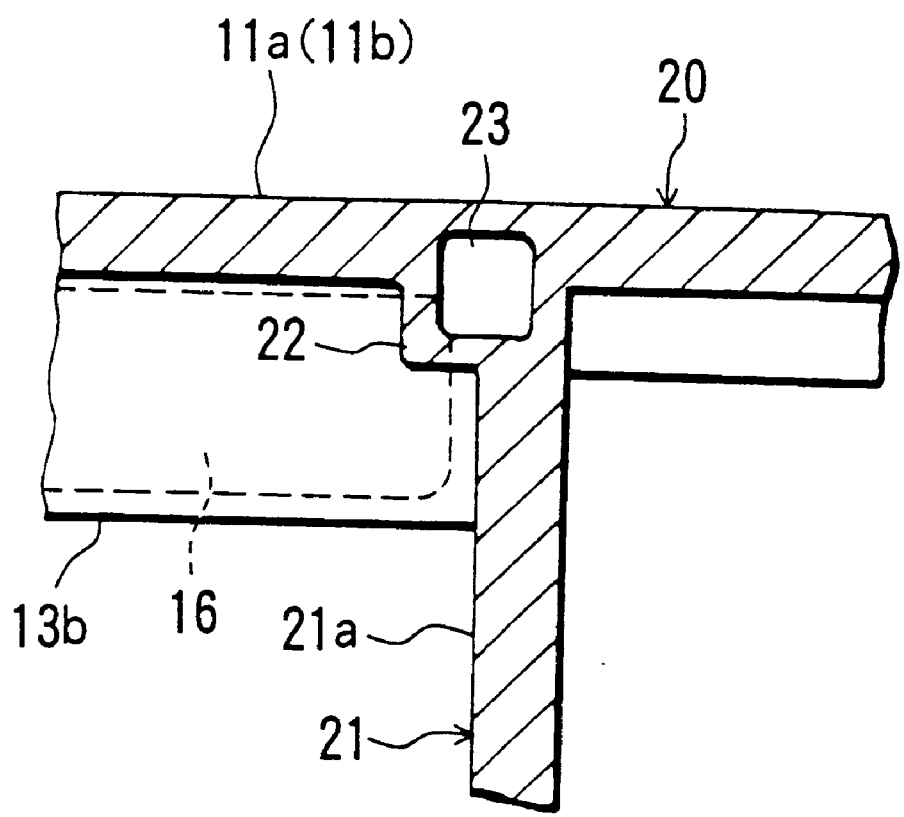
FIG. 5 is a sectional view showing a hollowed portion formed by introducing gas to reinforcing ribs when cutting the pallet constructive member along the line 5—5 shown in FIG. 4.

At a proximal portion, on the side of the side wall 21a, of the central block constructive member 21, i.e., a connecting portion between the side wall 21a and the board 11a which exists in such a position as to pass across the gas introducing hole of the die assembly, as obvious from FIGS. 4 and 5, a rib 22 having a height (its height and width are preferably 10 mm or thereabouts) smaller than the surface reinforcing rib 13b is formed along the side wall 21a. With this arrangement, the side wall proximal portion of the block constructive member 21 is formed to have a large thickness. Then, when injection-molding the pallet constructive member 20 by pouring the molten resin from the above-mentioned gas introducing hole or a molten-resin-only pouring hole separately formed, an adequate gas such as the air or nitrogen is introduced via the gas introducing hole before the inner part of the reinforcing rib 13 is solidified.

The gas introduced via the gas introducing hole flows into the thick-wall portion of the side wall proximal portion of the central block constructive member 21 and enters the inner parts of the respective surface reinforcing ribs 13b, thereby making these inner parts hollow. Accordingly, a hollowed portion indicated by the numeral 23 in FIG. 5 is a passageway for the introduced gas, which is formed within the thick-wall portion of the side wall proximal portion of the central block constructive member 21. It follows that this passageway 23 communicates with all the hollowed portions 16 of the individual surface reinforcing ribs 13.

Given next is an explanation of a structure of edge portions of the block constructive member that are adjacent to the port area 14a of the fork entry port 14, in other words, the edge portions of the block constructive member 21 that are located on both sides of the port area 14a of the fork entry port 14.

An inner part of the edge portion of the block constructive member 21 that is adjacent to the fork entry port 14, is formed with three pieces of comparatively small closed hollowed portions 24 so as to divide a internal space of the block constructive member 21. These closed hollowed portions 24 are defined by a partition wall 25 cooperating with side walls 21a, 21b and an edge wall 21c at the edge portion of the block constructive member 21.

This partition wall 25 is constructed of a first partition part 25a formed between the side walls 21a, 21b so as to be substantially orthogonal to these side walls 21a, 21b of the block constructive member in a longitudinal direction of the fork entry port 14, viz., in an entry direction of the fork, and two pieces of second partition parts 21b parallel to the fork entry direction in order to subdivide the spatial portion defined by the first partition part 25a and the side walls 21a, 21b and an edge wall 21c of the block constructive member 21. With this construction, it is possible to enhance the strength of the edge portion of the block constructive member 21 adjacent to the port area 14a of the fork entry port 14 against an impact given from the fork entry direction.

Note that the partition wall 25 for forming the closed hollowed portion 24 within the edge portion of the block constructive member 21 adjacent to the port area 14a of the fork entry port 14, may also be the first partition part 25a formed between the side walls 21a, 21b of the block constructive member 21 in the fork entry direction, and two pieces of second partition parts 21d inclined to the fork entry direction to subdivide the spatial area defined by the first partition part 25a, and the side walls 21a, 21b and the edge wall 21c of the block constructive member 21.

Figure 7:
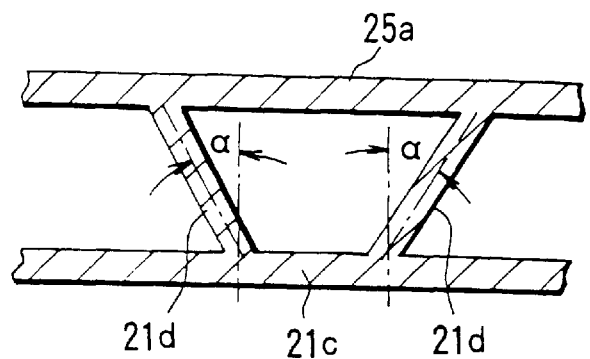
FIG. 7 is a partial sectional view showing in enlargement the structure of the edge portion of the block constructive member of the pallet constructive member shown in FIG. 6.

As illustrated in FIG. 7, if an inclined angle $\alpha$ to the side wall 21c of the second partition part 21d is 0 degree, the construction becomes as in the embodiment shown in FIG. 4, and hence this inclined angle $\alpha$ can be set within a range up to 90 degrees excluding 0 degree. In the case of 90 degrees, however, the second partition parts 21d are parallel to the side wall 21c of the block constructive member 21 and therefore eliminated. Hence, the inclined angle $\alpha$ is, when expressed by an inequality, defined such as: $0°<\alpha<90°$.

Figure 6:
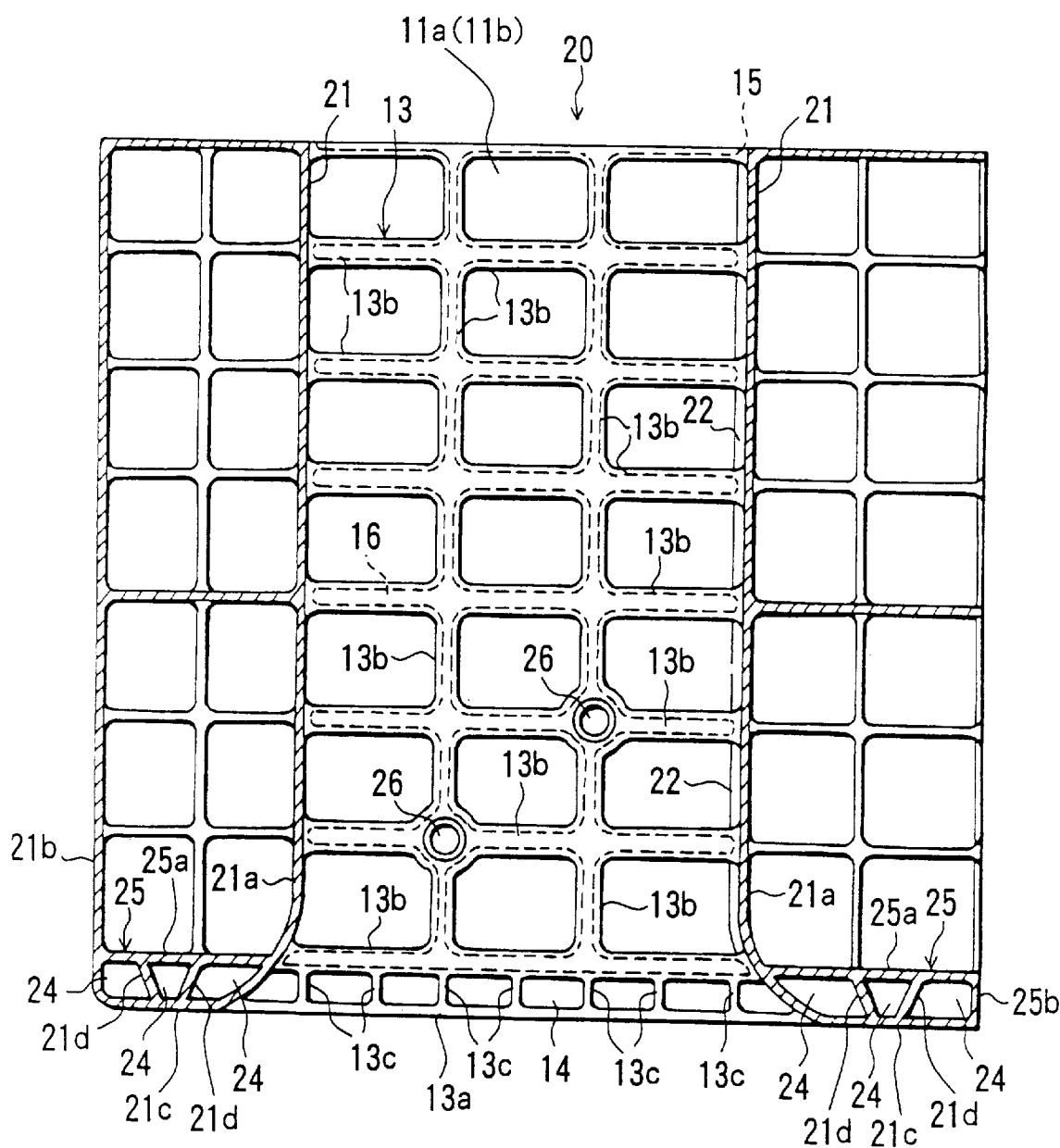
FIG. 6 is a plan view similar to FIG. 8, showing a modified example of a structure of an edge portion of a block constructive member of the pallet constructive member shown in FIG. 4.

Note that what is indicated by 26 in FIGS. 4 and 6 is a slip preventive rubber grommet press-fitted into the hole formed in the hollowed rib 13b so as not to cause a relative slip between the fork and the synthetic resin pallet when the fork enters the fork entry port 14 on occasion of using the present synthetic resin pallet.

Incidentally, the corners of the synthetic resin pallet P are portions liable to receive an impact when in use, and therefore required to be reinforced in particular. For this purpose, with respect to the corner closed hollowed portions 24 formed in the block constructive members 21 at the outer edge portions of the pallet constructive member 20, it is desirable that both of an interval A between the second partition part 25b and the side wall 21b and an interval B between the first partition part 25a and the side wall 21c be approximately 30–80 mm.

Further, as for the closed hollowed portion 24 within the block constructive member 21 that is located at the corner of the synthetic resin pallet P, a thickness of each of the surfaces 11a, 11b of this portion 24 is set to 3–5 mm thicker by 1–3 mm or above than those of other surfaces. However, a deck board surface is flat on the whole, and therefore an increment in its thickness is given to the inside of the closed hollowed portion 24.

Figure 8:
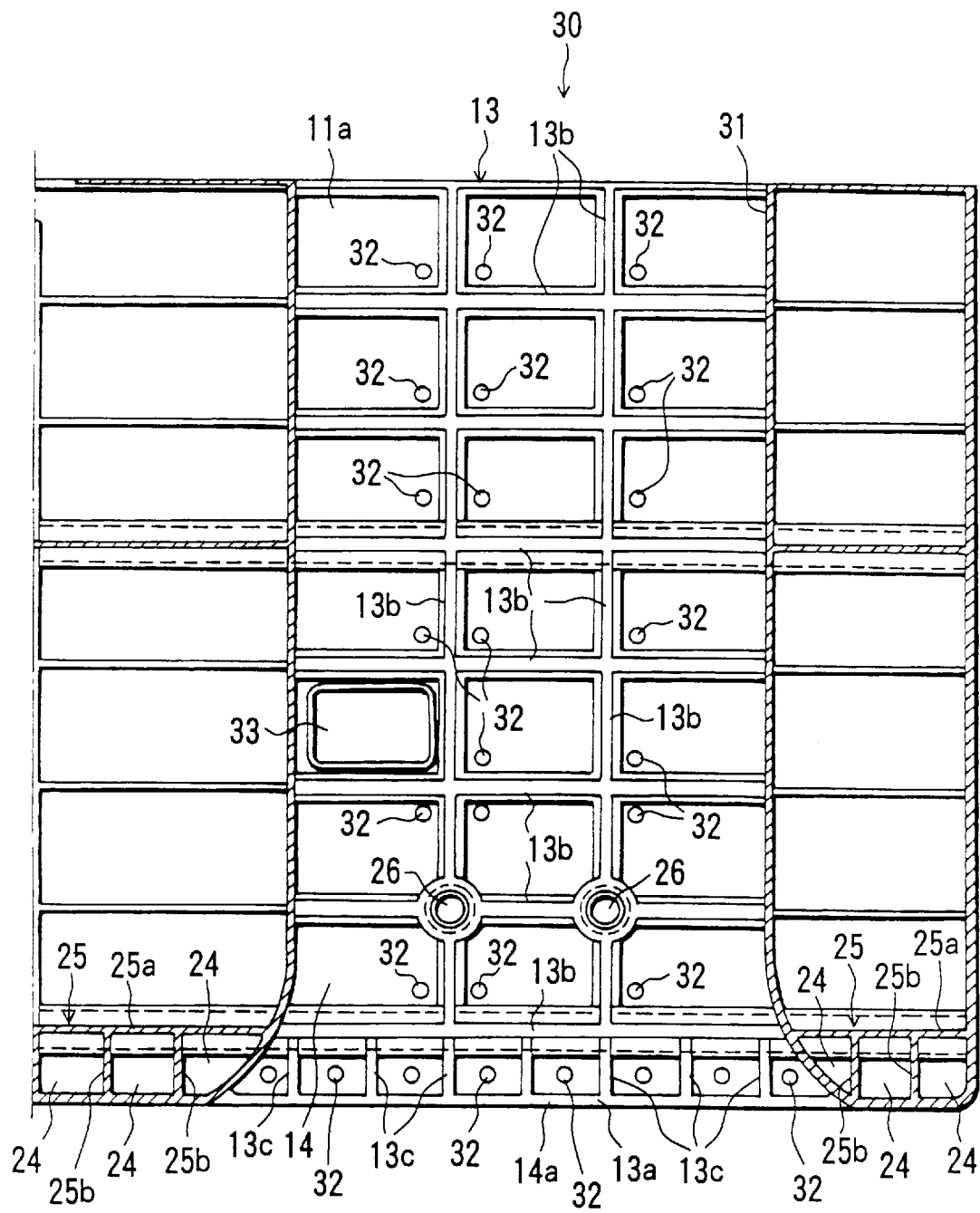
FIG. 8 is a plan view of a one-fourth part, as viewed from inside, of one of two pallet constructive members constituting a two-way synthetic resin pallet in a third embodiment of the present invention.

FIG. 8 is a plan view of one-fourth, as viewed from inside, of one of two pallet constructive members 30 constituting the two-way synthetic resin pallet in accordance with a third embodiment of the present invention. The pallet constructive members 30 constituting the synthetic resin pallet in accordance with the third embodiment include, as substantially in the same way as the pallet constructive members 20 illustrated in FIG. 4, a plurality of block constructive members 31 and the reinforcing ribs 13 inwardly of the board 11a. Note that the same components of the pallet constructive member 30 shown in FIG. 8 as those of the pallet constructive member 20 shown in FIG. 4, are marked with the same reference numerals, and their explanations are omitted.

A different configuration of the pallet constructive member 30 from the pallet constructive member 20 shown in FIG. 4 is that a water discharge hole 32 for discharging the water is formed in a portion surrounded by the reinforcing ribs 13 formed lengthwise and crosswise inwardly of the board 11. With this configuration, it never happens that the rainwater permeating from the port area 14a into the fork entry port 14 gathers in a recess surrounded by the reinforcing ribs 13.

Moreover, a position of the grommet 26 fitted to the fork entry port 14 of the pallet constructive member 30 to prevent the slip between the fork of the forklift and the pallet, is spaced away less than 200 mm from the edge of the board 11a. Namely, when performing loading and unloading operations onto and from a truck, a fine adjustment of the pallet position is frequently made while pushing or pulling the pallet with the fork of the forklift being inserted shallow into the fork entry port 14. In such a state, the operation might become preferable if the grommet 26 is provided in the position described above.

Further, referring to FIG. 8 the numeral 33 represents a hand opening formed in the board 11a which is used when lifting or tilting the synthetic resin pallet.

Figure 9:
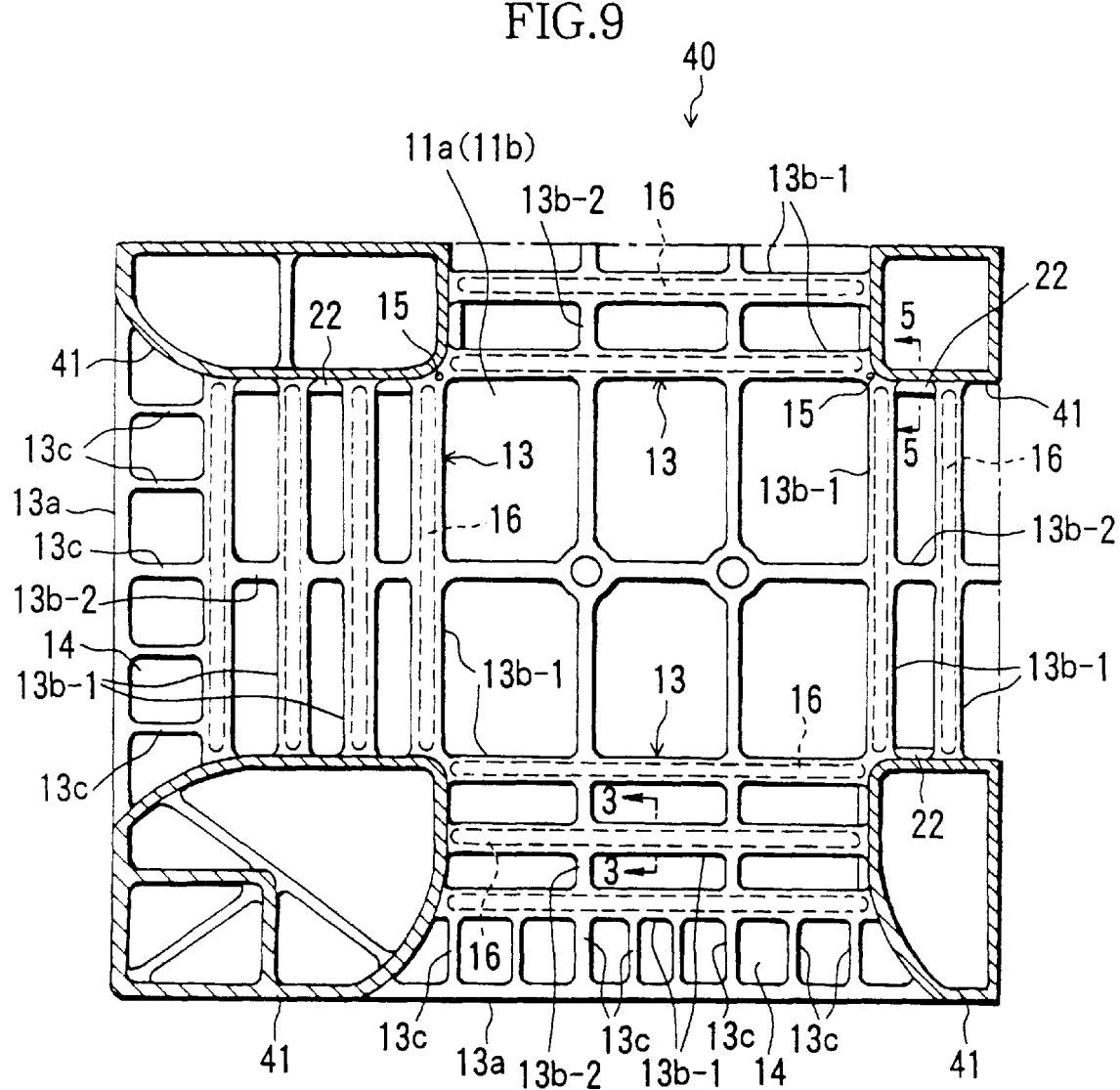
FIG. 9 is a plan view of a one-fourth part, as viewed from inside, of one of two pallet constructive members constituting a four-way synthetic resin pallet in a fourth embodiment of the present invention.

FIG. 9 shows one-fourth of one of two pallet constructive members 40 constituting a four-way synthetic resin pallet in accordance with a fourth embodiment of the present invention. This pallet constructive member 40 comprises the board 11a mounted mainly with the load, block constructive members 41 formed on the inside thereof, and the reinforcing ribs 13 provided intersecting lengthwise and crosswise on the inside of the board 11a. These components has the same configurations as those of the pallet constructive members 10a, 10b of the synthetic resin pallet and marked with the same reference numerals, and their explanations are omitted.

In this pallet constructive member 40, the reinforcing rib 13 provided inwardly of the board 11a is, as in the case of the pallet constructive members 10a, 10b in the first embodiment, constructed of the edge reinforcing rib 13a, the surface reinforcing rib 13b and the connection reinforcing rib 13c. The edge reinforcing rib 13a and the connection reinforcing rib 13c are solid. Then, the surface reinforcing rib 13b is formed of a solid rib and a hollowed rib.

More specifically, a surface reinforcing rib 13b-1 extending in a direction orthogonal to the longitudinal direction of the fork entry port 14 is hollow, while a surface reinforcing rib 13b-2 parallel to the longitudinal direction of the fork entry port 14 is solid.

Figure 10:
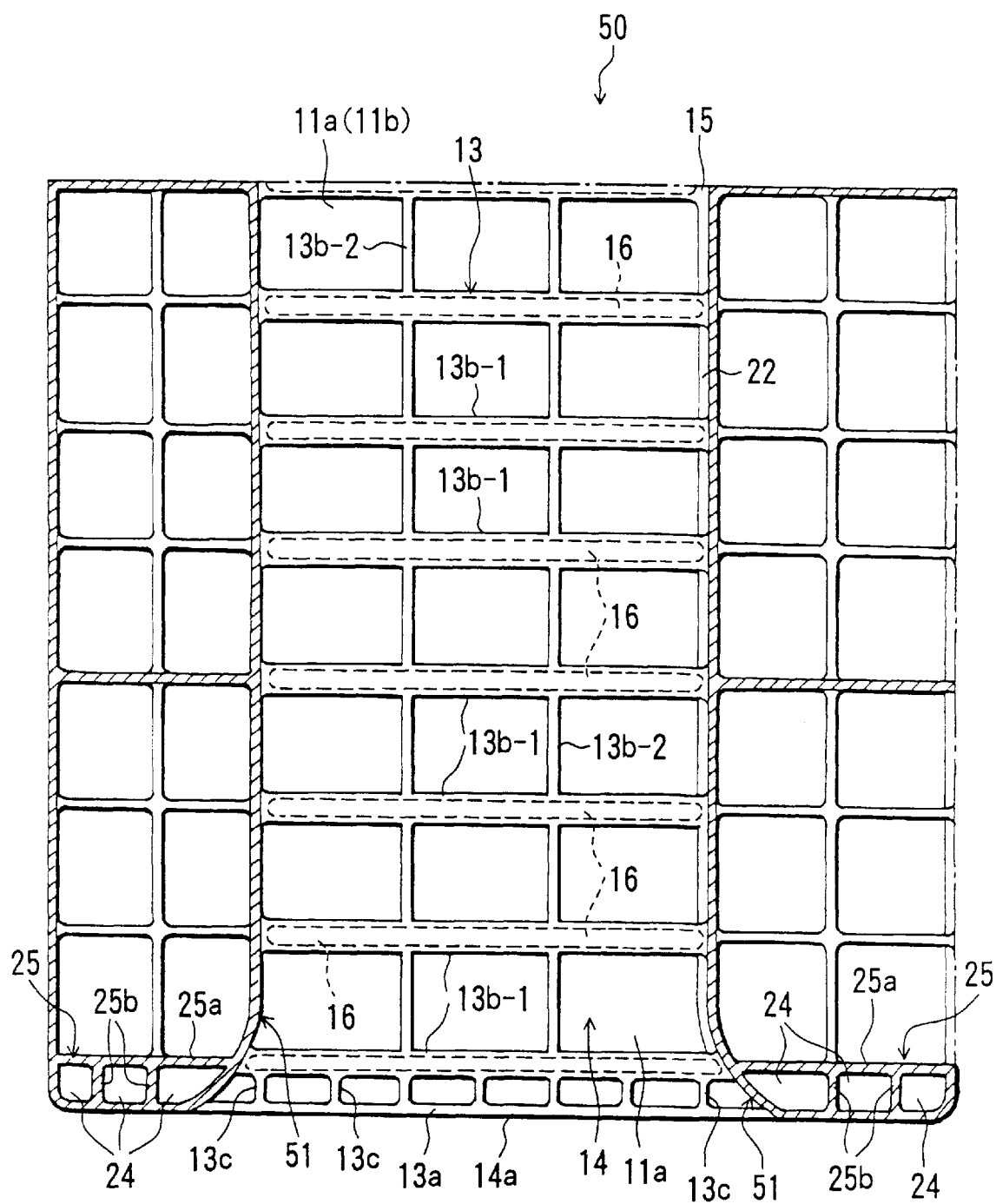
FIG. 10 is a plan view of a one-fourth part, as viewed from inside, of one of two pallet constructive members constituting a two-way synthetic resin pallet in a fifth embodiment.

FIG. 10 illustrates one-fourth of one of two pallet constructive members 50 constituting a four-way synthetic resin pallet in accordance with a fifth embodiment of the present invention. Each of these pallet constructive members 50, which constitute the two-way synthetic resin pallet, comprises, as obvious from FIG. 10, the board 11a mounted mainly with the load, block constructive members 51 formed on the inside thereof, and the reinforcing ribs 13 provided intersecting lengthwise and crosswise on the inside of the board 11a. These components have the same configurations as those of the pallet constructive member 10 in the synthetic resin pallet in the first embodiment and marked with the same reference numerals, and explanations thereof are omitted. The components other than those described above are substantially the same as those of the pallet constructive members 40 constituting the synthetic resin pallet in the fourth embodiment shown in FIG. 9.

That is, in the pallet constructive member 50 shown in FIG. 10, the surface reinforcing rib 13b constituting the reinforcing rib 13 is similarly constructed of the hollowed surface reinforcing rib 13b-1 extending in the direction orthogonal to the longitudinal direction of the fork entry port 14, and the solid surface reinforcing rib 13b-2 parallel to the longitudinal direction of the fork entry port 14. In the pallet constructive member 50 illustrated in FIG. 10, the edge portions of the block constructive member 41 that are located on both sides of the port area 14a of the fork entry port 14, are constructed in the same way as the pallet constructive member 20 shown in FIG. 4.

According to the above-described synthetic resin pallets in accordance with the fourth and fifth embodiments, the hollowed surface reinforcing rib 13b-1 is formed in only the direction orthogonal to the longitudinal direction of the fork entry port 14, and hence, as in the embodiments shown in FIGS. 2, 4 and 6, the hollowed surface reinforcing ribs do not intersect each other, with the result that a decline of flexural strength and an occurrence of flexure can be prevented more surely.

Figure 11:
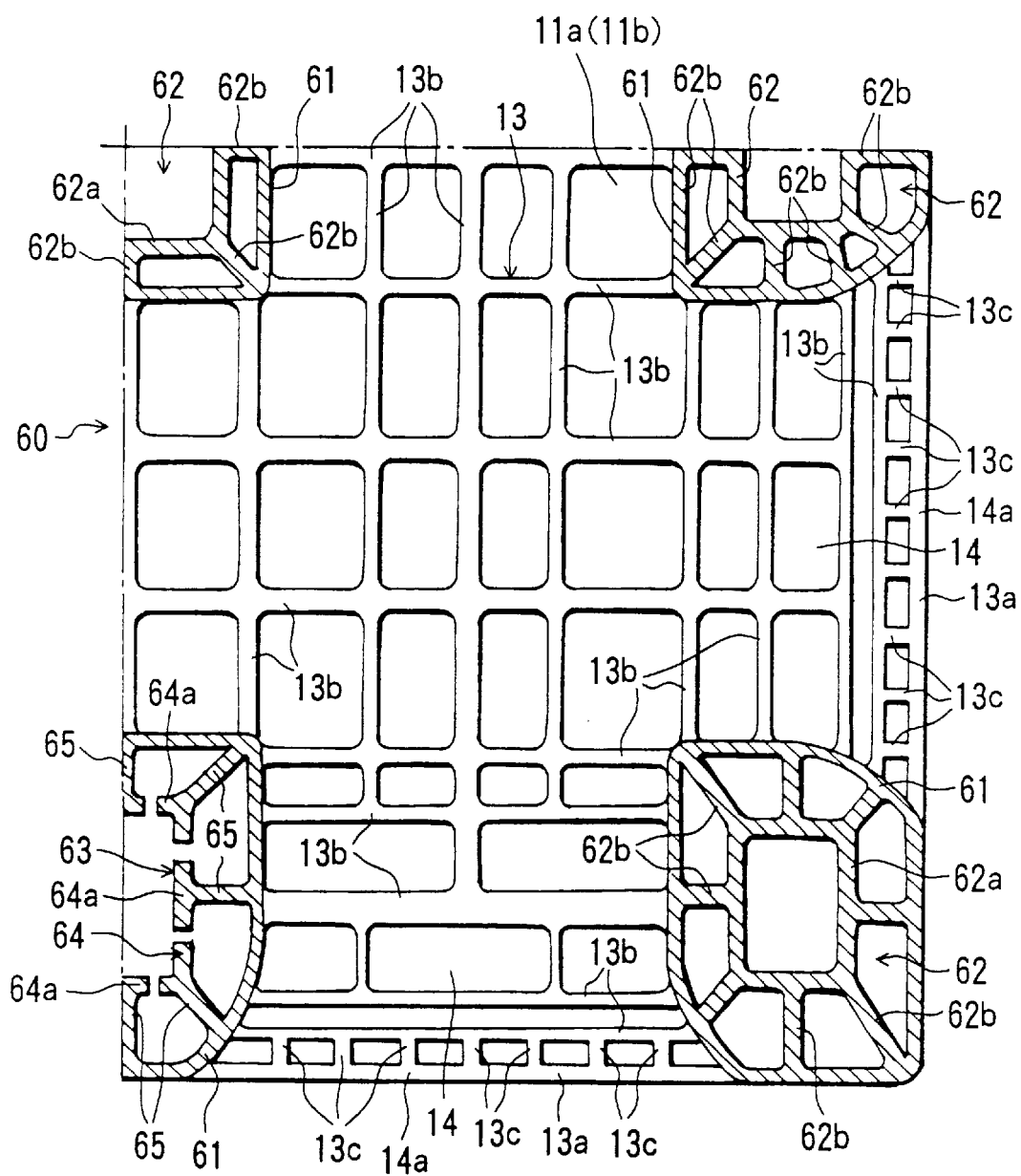
FIG. 11 is a plan view of a one-fourth part, as viewed from inside, of one of two pallet constructive members constituting a four-way synthetic resin pallet in a sixth embodiment of the present invention.

FIG. 11 illustrates one-fourth of one of two pallet constructive members 60 constituting a four-way synthetic resin pallet in accordance with a sixth embodiment of the present invention. Each of these pallet constructive members 60, which constitute the two-way synthetic resin pallet, comprises the board 11a mounted mainly with the load, block constructive members 61 formed at both edge portions and a middle portion on the inside thereof, and the reinforcing ribs 13 similarly provided intersecting lengthwise and crosswise on the inside of the board 11a. The synthetic resin pallet P in accordance with the sixth embodiment is manufactured by making the pallet constructive members 60 face to each other, matching the block constructive members 61 with each other, and integrally welding the matched portions thereof.

The reinforcing ribs 13 provided intersecting lengthwise and crosswise on the inside of the board 11a of the pallet constructive member 60 are substantially the same as the reinforcing ribs 13 of the pallet constructive member 10a shown in FIG. 2 and are therefore marked with the same reference numeral, and an explanation thereof is omitted.

Figure 12:
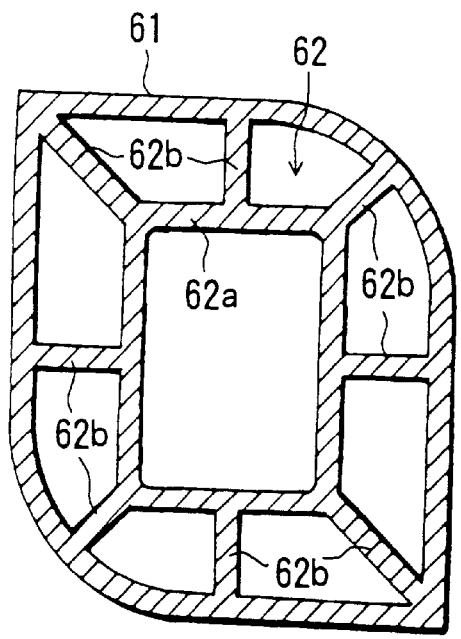
FIG. 12 is a plan view showing in enlargement a reinforcing structural portion provided within the block constructive member of the pallet constructive member shown in FIG. 11.

In the synthetic resin pallet P in the sixth embodiment, reinforcing structural portions 62 are formed inwardly of some block constructive members 61 as well as forming reinforcing structural portions 63 within other block constructive members 61, which construction enhances a strength of each of the block constructive members 61. The former reinforcing structural portion 62 is constructed, as apparent from FIG. 11 and FIG. 12 showing this block constructive member 61 in enlargement, an annular post 62a and a radial reinforcing rib 62b radially extending from an outer periphery of the annular post 62a and connected to an inner surface of the block constructive member 61.

This reinforcing structural portion 62 is formed at substantially the same height as the height of the block constructive member 61 of the pallet constructive member 60. Accordingly, when manufacturing the synthetic resin pallet by making the two pallet constructive members 60 face to each other, matching the block constructive members 61 with each other and integrally welding the matched portions thereof, the face-to-face reinforcing structural portions 62 within the block constructive member 61 become contact and integrally welded.

Figure 13:
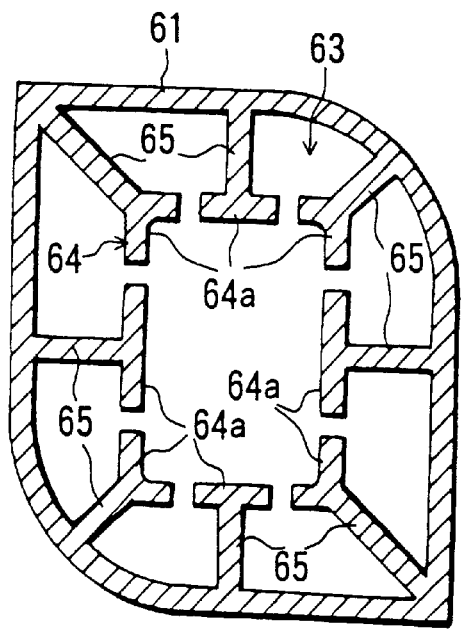
FIG. 13 is a plan view similar to FIG. 12, sowing another reinforcing structural portion provided within the block constructive member of the pallet constructive member illustrated in FIG. 11.

Further, the latter reinforcing structural portion 63 is constructed such that the annular post 64 is, as obvious from FIG. 11 and FIG. 13 showing the block constructive member 61 in enlargement, composed of an aggregation of segments 64a discontinuous in the peripheral direction, one edge of the radial reinforcing rib 65 is connected to each segment 64a, and the other edge thereof is connected to the internal surface of the block constructive member 61.

Figure 14:
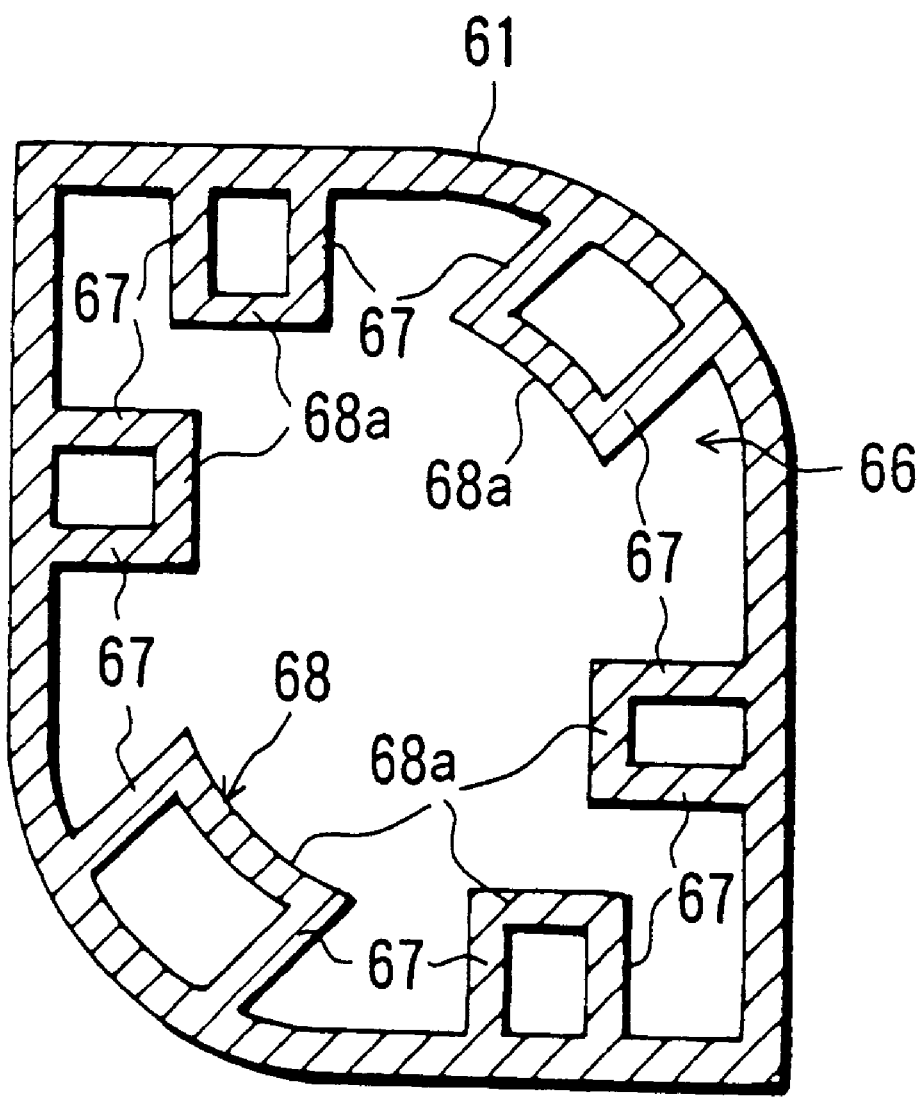
FIG. 14 is a plan view showing another modified example of the reinforcing structural portion illustrated in FIG. 13.

As apparent from this, the "annular post" in the synthetic resin pallet according to the present invention is used to give an implication of including a post formed by the wall surface continuous or discontinuous in the peripheral direction. Note that the reinforcing structural portion 63 shown in FIG. 13 is constructed such that the radial reinforcing rib 65 is connected to a substantially middle portion of each segment 64a. FIG. 14 illustrates a reinforcing structural portion 66 as a modified example of the reinforcing structural portion 63. This reinforcing structural portion 66 is constructed in such a manner that a radial rib 67 is connected to both edges of each discontinuous segment 68a constituting the annular post 68.

Figure 15:
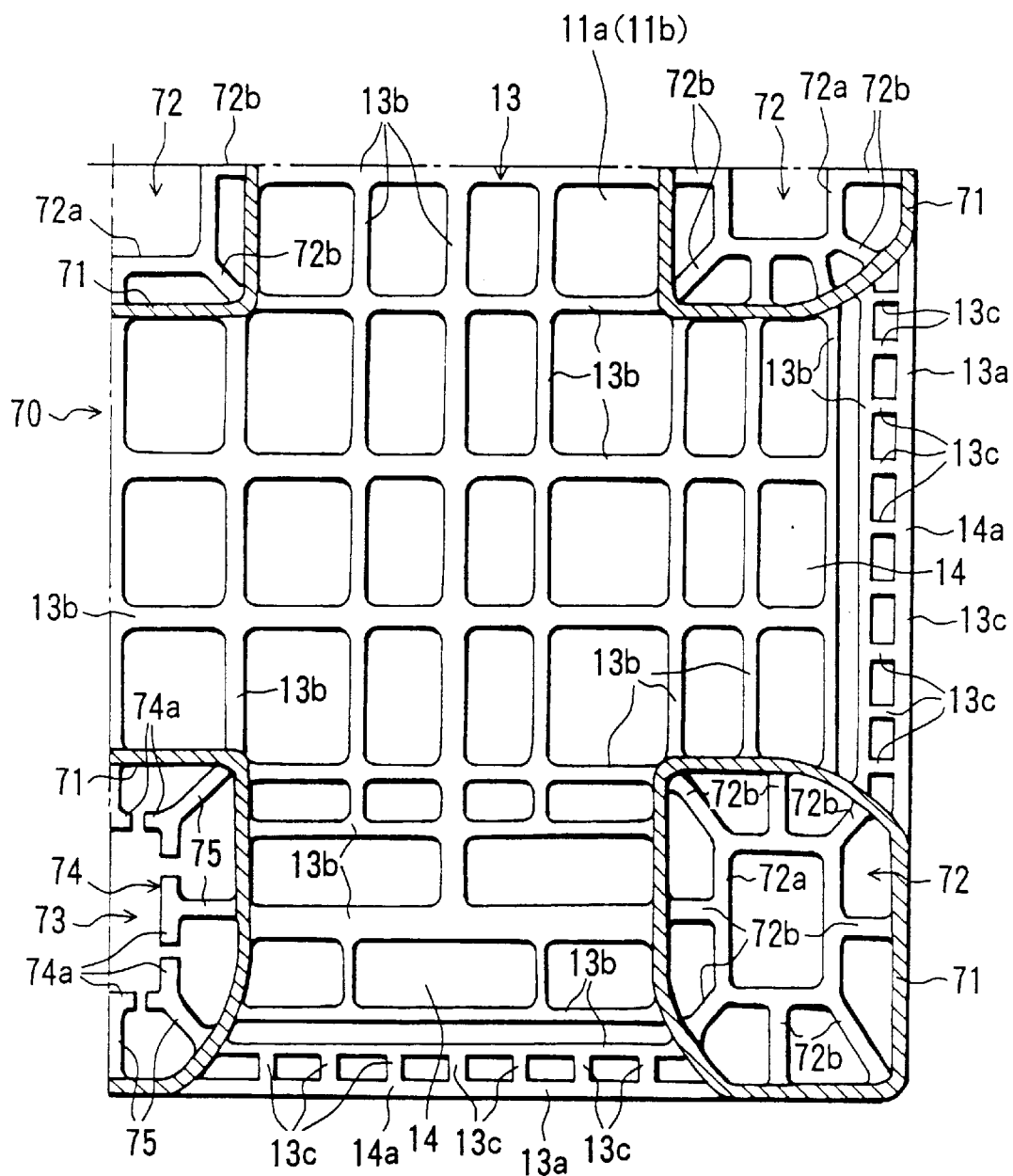
FIG. 15 is a plan view of a one-fourth part, as viewed from inside, of one of two pallet constructive members constituting a four-way synthetic resin pallet in a seventh embodiment of the present invention.

Further, FIG. 15 shows one-fourth of one of two pallet constructive members 70 constituting the synthetic resin pallet P in a seventh embodiment of the present invention. Since a basic structure of this pallet constructive member 70 is the same as the pallet constructive member 60 shown in FIG. 11, the same or corresponding components are marked with the same reference numerals, and their description are omitted.

Reinforcing structural portions 72 are provided within some of the block constructive members 71 integrally provided on the board 11a of the pallet constructive member 70 illustrated in FIG. 15. Different reinforcing structural portions 73 are provided within other block constructive members 71. Configurations of these reinforcing structural portions 72, 73 correspond to the reinforcing structural portions 62, 63 shown in FIGS. 12 and 13. The reinforcing structural portion 72 includes a continuous annular post 72a and a radial reinforcing rib 72b, and the reinforcing structural portion 73 includes a discontinuous annular post 74 consisting of a plurality of segments 74a, and a radial reinforcing rib 75.

A different point of the reinforcing structural portions 72, 73 from the reinforcing structural portions 62, 63 is that the reinforcing structural portions 72, 73 are formed slightly lower than a height of the block constructive member 71. Accordingly, when making the two pallet constructive members 70 face to each other, matching the block constructive members 71 with each other and integrally welding the matched portions thereof, the face-to-face reinforcing structural portions 72, 73 within the block constructive member 71 of each pallet constructive member 70, face to each other at a slight spacing without being in contact with each other.

Owing to the reinforcing structural portions 62, 63, 72, 73 of the block constructive members 61, 71 provided in the synthetic resin pallets in accordance with the sixth and seventh embodiments, the reinforcing ribs 62b, 65, 72b, 75 radially extending support the annular post 62a, 64, 72a, 74 and the bodies of the block constructive members 61, 71.

As a result, the block constructive members 61, 71 exhibit a considerable strength against the impact exerted from outside. Besides, in the above-described synthetic resin pallet, the structural portion for reinforcing the block constructive member includes a comparatively large number of hollowed portions, and hence there must be no extreme increase in weight, which therefore makes it feasible to restrain a rise in manufacturing costs.

Figure 16:
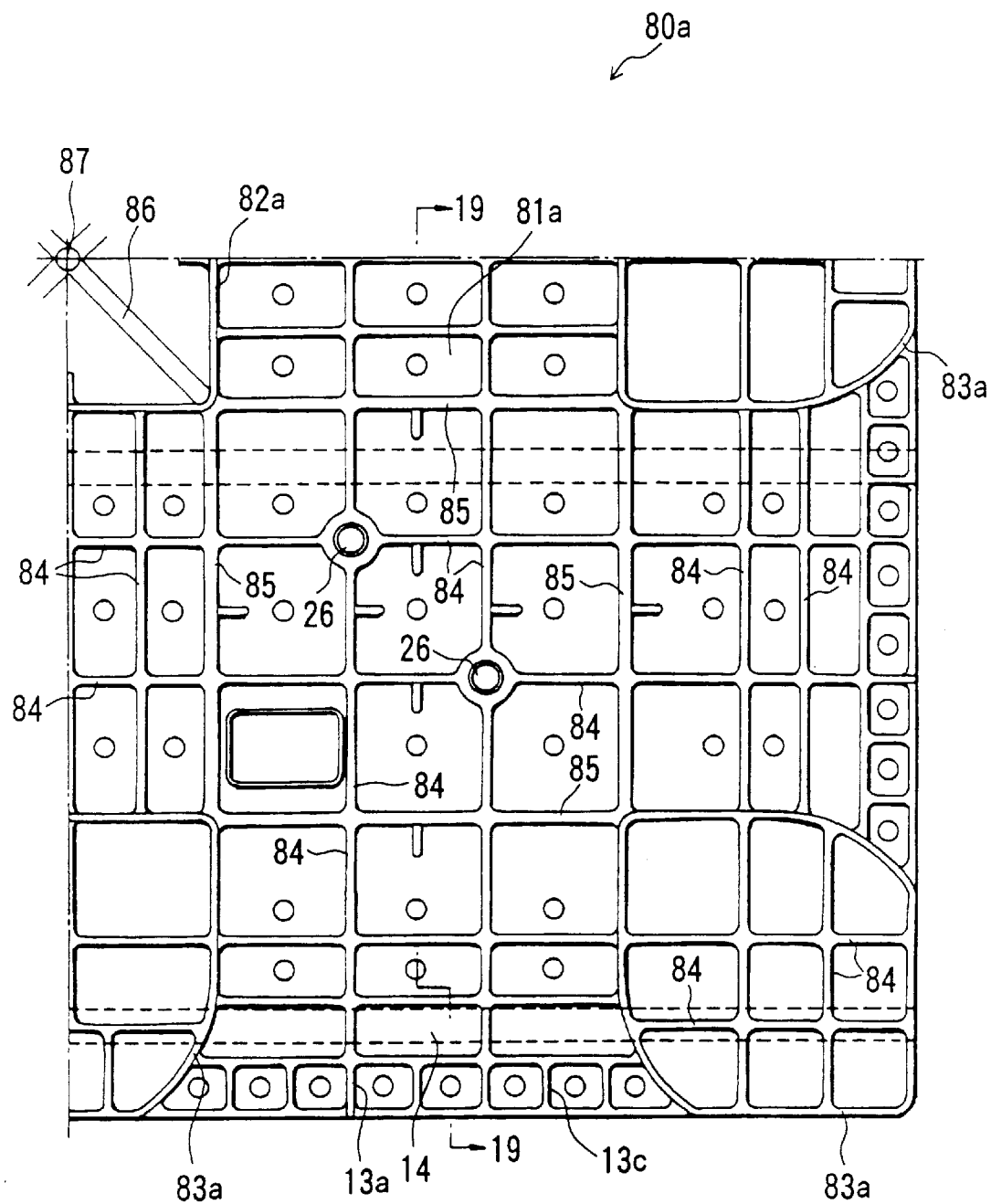
FIG. 16 is a plan view of a one-fourth part, as viewed from inside, of one (a top pallet constructive member) of two pallet constructive members constituting a four-way synthetic resin pallet in an eighth embodiment of the present invention.
Figure 17:
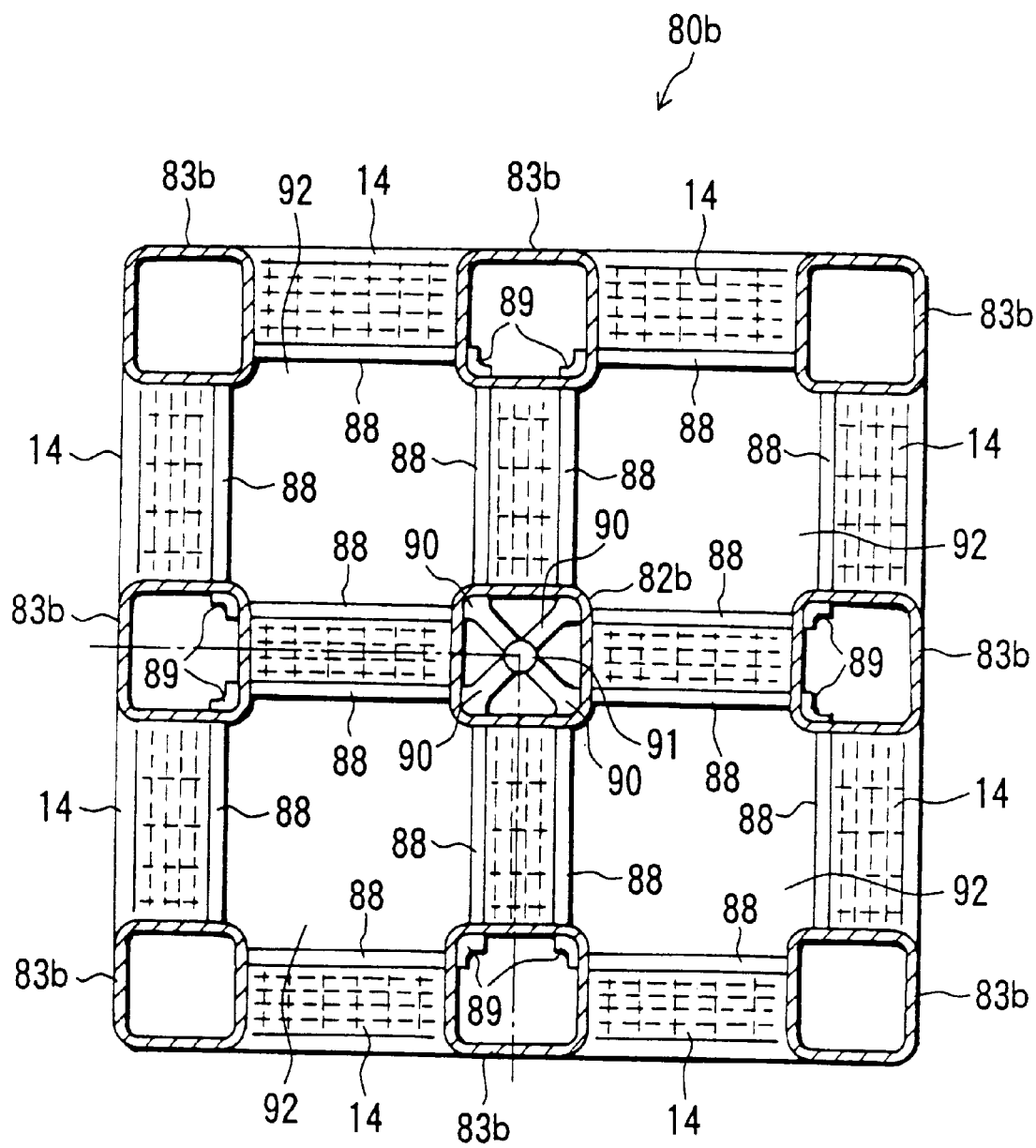
FIG. 17 is a sectional view schematically illustrating the whole of the other (a bottom pallet constructive member) of the two pallet constructive members constituting the synthetic resin pallet in the eighth embodiment.

FIG. 16 is a plan view of one-fourth, as viewed in detail from inside, of one of two pallet constructive members constituting a four-way synthetic resin pallet in accordance with an eight embodiment of the present invention. Further, FIG. 17 is a schematic plan view of the whole of another pallet constructive member as viewed from inside. This synthetic resin pallet is, as in the embodiments discussed so far, manufactured by making two pallet constructive members 80a, 80b face to each other and integrally welding them. Further, this synthetic resin pallet is of a non-reversible type of its being used with only one-sided surface mounted with a load.

A top pallet constructive member 80a comprises a board 81a mounted with the load, and nine pieces of block constructive members 82a, 83a neatly arrayed on the inside thereof at a predetermined interval (see FIG. 17 with respect to an entire layout of the block constructive members of the pallet constructive member). Of these nine block constructive members 82a, 83a, what is indicated by the reference symbol 82a is one central block constructive member taking substantially a square in section and provided at the central part of the pallet constructive member 80a, and what is designated by the reference symbol 83a are eight pieces of peripheral blocks constructive members provided along the peripheral edge of the board 81a so as to surround the central block constructive member 82a. It is desirably that a wall thickness of each of those block constructive members 82a, 83a be as thin as approximately 3–7 mm.

Then, comparatively thin reinforcing ribs 84 are provided intersecting lengthwise and crosswise on the inside of the board 81a of the this top pallet constructive member 80a. A multiplicity of such comparatively thin reinforcing ribs 84 are provided also inwardly of the peripheral block constructive members 83a in order to resist the impact etc exerted from outwardly of the peripheral block constructive members 83a as well as to enhance the strength of the board 81a.

A sectional configuration of this reinforcing rib 85 is essentially the same as that of the reinforcing rib 13 illustrated in FIG. 3. Hence, this reinforcing rib 85 is also formed so that a width dimension L falls within a range of 5–40 mm and preferably 8–20 mm, and that a height dimension H from the inner surface of the board 71a is 10–50 mm and, preferably, 15–40 mm.

With this configuration, it follows that the two reinforcing ribs 85 extending from the peripheral block constructive members 83a arranged in the lengthwise and crosswise directions of the central block constructive member 82a are connected to each angular portion of the central block constructive member 82a (see FIG. 16). Gas flowing ribs 86 are formed in positions of diagonal lines inwardly of the central block constructive member 82a, and edges of these gas flowing ribs 86 are connected to edges of the reinforcing ribs 85 via the wall portion of the central block constructive member 82a.

As a result, all the reinforcing ribs 85 provided between the block constructive members 82a, 83a are connected to the gas flowing ribs provided in a cross shape within the central block constructive member 82a, and, as described herein, the hollowed portions 16 are, as in the case of the reinforcing ribs 13 shown in FIG. 3, inwardly of the reinforcing ribs 85 that are all connected to the gas flowing ribs 86.

Next, a method of thus forming the hollowed portions 16 within the reinforcing ribs 85, will be explained. An intersecting point 87 of the gas flowing ribs 86 disposed in the cross shape within the central block constructive member 82a, is the central point of this central block constructive member 82a as well as being the central point of the pallet constructive member 80a. The gas is blown in from an arbitrary position of the cross-shaped gas flowing ribs 86. The gas blow-in position in the eight embodiment is the intersecting point 87 of the cross-shaped gas flowing ribs 86.

Namely, the pallet molding die assembly (unillustrated) for molding the pallet constructive member 80a is formed with one gas introducing hole (not shown) in a portion corresponding to the inside position of the above-described pallet constructive member 80a. Then, when injection-molding the pallet constructive member 80a by pouring the molten resin from a separately provided molten-resin-only pouring hole, a proper gas such as the air or nitrogen etc is introduced via this gas introducing hole before the inner parts of the reinforcing ribs 85 and the gas flowing ribs 86 are solidified.

The gas introduced via the gas introducing hole flows into all the reinforcing ribs 85 from and via the gals flowing ribs 86, thereby forming the hollowed portions 16 in the interiors thereof. Accordingly, the internal hollowed portions 16 serve as passageways for the introduced gas, which are formed in the reinforcing ribs 85, and these passageways of all the reinforcing ribs 85 communicated with the hollowed portions 16 of the gals flowing ribs 86.

Note that after the gas has been blown from the gas flowing ribs 86, the ribs 86 are formed with apertures as gas introducing holes, and the hollowed portions in the reinforcing ribs 85 comes into a state of communicating with the atmosphere via the gas introducing holes. For convenience, this gas introducing hole is also indicated by the reference numeral 87.

An internal pressure of the gas blown into the reinforcing ribs 85 from the gas flowing ribs 86, acts uniformly in the hollowed portions, and therefore it never happens that the wall thickness of the molded reinforcing rib 85 becomes extremely small. The hollowed portions 16 are thus formed in the reinforcing ribs 85, thereby obtaining effects of reducing a weight of the synthetic resin pallet, fluctuations in dimension when molded, and a molding time as well.

Figure 18:
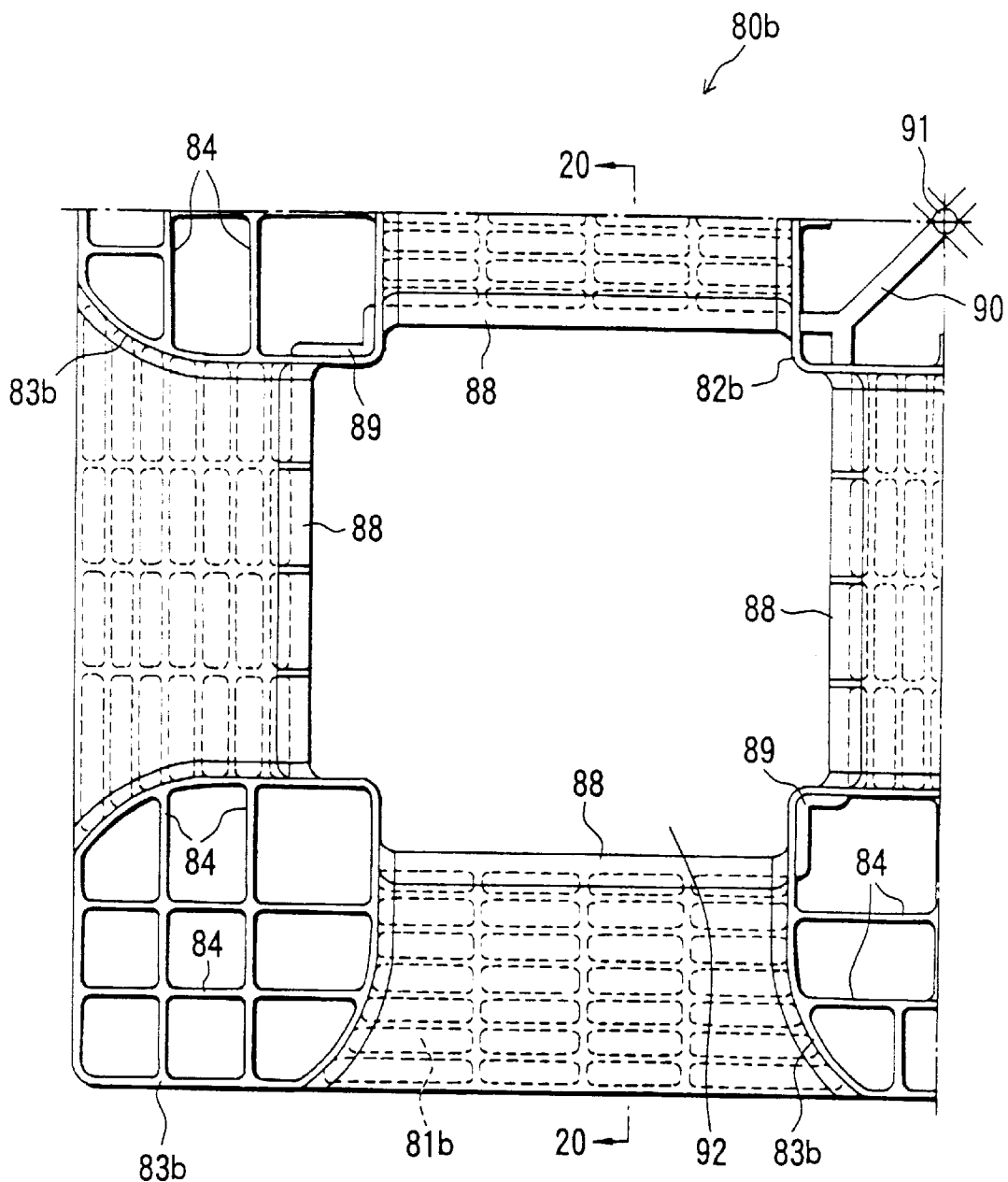
FIG. 18 is a sectional view showing a one-fourth part of the bottom pallet constructive member shown in FIG. 17.
Figure 19:
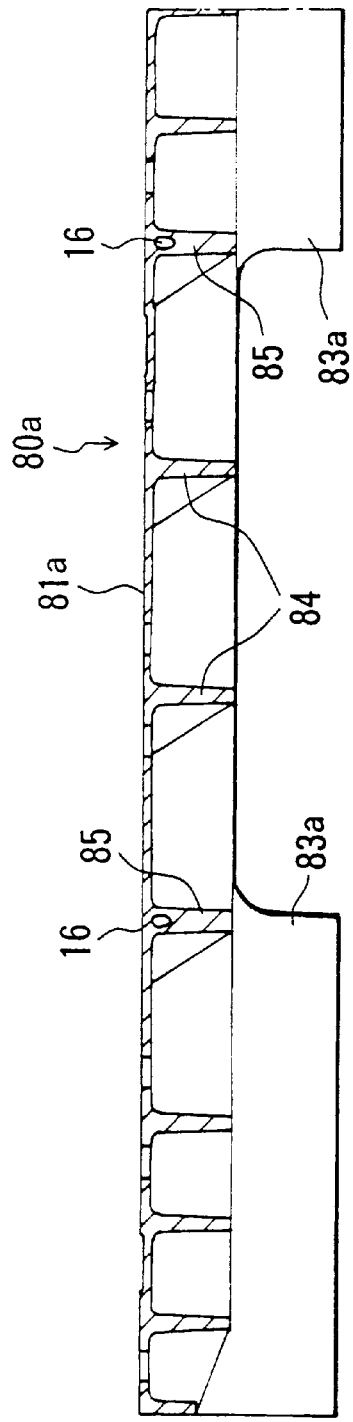
FIG. 19 is a sectional view showing the pallet constructive member taken along the line 19—19 shown in FIG. 19.
Figure 20:
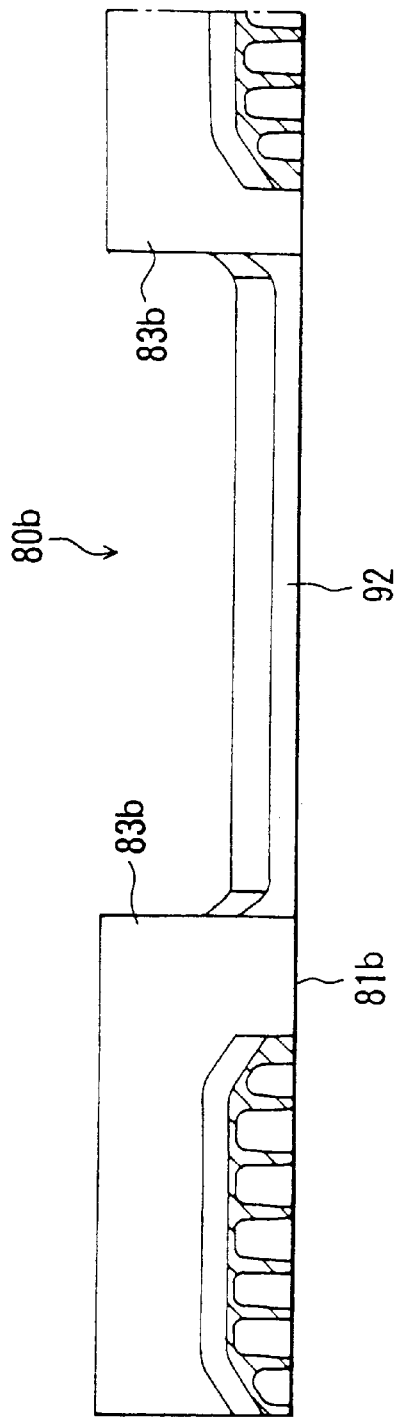
FIG. 20 is a sectional view showing the pallet constructive member taken along the line 20—20 shown in FIG. 18.

On the other hand, with respect to the bottom pallet constructive member 80b shown in FIGS. 17 and 18, a central block constructive member 82b and peripheral block constructive members 83b are similarly provided on the inside of the baseboard 81b. The central block constructive member 82b and the peripheral block constructive members 83b correspond to the block constructive members 82a, 83a of the top pallet constructive member 80a described above, and are absolutely the same in terms of their forming positions, sectional configurations and sizes as well.

In the bottom pallet constructive member 80b, when looking at a one-fourth area divided by a lengthwise central line and crosswise central line passing though the center of the central block constructive member 82b, a comparatively thick reinforcing rib 88 is formed in a position substantially inscribed in four block constructive members 82b, 83b.

As in the case of the above-described top pallet constructive member 80a, however, the reinforcing ribs 88 extending respectively from the central block constructive member 82b and the peripheral block constructive members 83b provided at the corners of the pallet constructive member 80b, are not connected to each other outwardly of an angular portion of the peripheral block constructive member 83b provided at the middle portion at the peripheral edge of the pallet constructive member 80b.

Therefore, the reinforcing ribs 88 are substantially connected by the peripheral block constructive members 83b provided at the middle portions at the peripheral edge of the pallet constructive member 80b, and hence connection reinforcing ribs 89 are provided along the wall internal surfaces thereof. With this configuration, the two reinforcing ribs 88 extending from the peripheral block constructive members 83b arranged in the lengthwise and crosswise directions of the central block constructive member 82b, are connected to each angular portion of the central block constructive member 82b.

Then, within the central block constructive member 82b, gas flowing ribs 90 are formed in positions of the diagonal lines, edges of these gas flowing ribs 90 are connected through the wall portion of the central block constructive member 82b, and the gas flowing rib 90 is formed with a gas introducing hole in the end. In this embodiment also, the gas introducing hole is formed at an intersecting point 91 of the cross-shaped gas flowing ribs 90 as in the case of the top pallet constructive member 80a, and for convenience a mark of this gas introducing hole is indicated by the reference numeral 91.

In consequence of this, it follows that all the reinforcing ribs 88 provided between the block constructive members 82b, 83b are connected to the gas flowing ribs 90 provided in the cross-shape within the central block constructive member 82b. As in the case of the reinforcing ribs 85 of the top pallet constructive member 80a, the hollowed portions 16 are formed in the reinforcing ribs 88 that are all thus connected to the gas flowing ribs 90. A method of forming the hollowed portions in the reinforcing ribs 88 is the same as the method of forming the hollowed portions in the reinforcing ribs 85 of the top pallet constructive member 80a, and therefore its explanation is omitted.

Note that in this bottom pallet constructive member 80b, when looking at a one-fourth area of the synthetic resin pallet as shown in FIG. 18, an aperture 92 is formed in a portion surrounded by the reinforcing ribs 88 formed in positions substantially inscribed in the four block constructive members 82b, 83b. This aperture 92 serves as an exit/entrance portion for a wheel when manipulating the synthetic resin pallet with a hand lift truck or a pallet jack.

The synthetic resin pallet in accordance with the eighth embodiment is manufactured by making the top and bottom pallet constructive members 80a, 80b face to each other, matching the block constructive members 82a, 82b and the block constructive members 83a, 83b with each other, and integrally welding the matched portions thereof. Thus, the hollowed cylindrical blocks are formed by making the top and bottom pallet constructive members 80a, 80b face to each other, matching the block constructive members 82a, 82b and 83a, 83b with each other, and integrally welding them. A space (a port) between these blocks serves as the fork entry port 14.

The block in the thus molded synthetic resin pallet takes the closed hollowed cylindrical shape, and hence the gas introducing holes 87, 91 formed in the top and bottom pallet constructive members 80a, 80b that locate in the central position within the central block, are never exposed to the outside (atmosphere). Therefore, it is feasible to prevent the rainwater from permeating the hollowed portions 16 within the reinforcing ribs 85, 88 via the gas introducing holes 87, 91 during the use of the synthetic resin pallet.

In the synthetic resin pallet in accordance with the eighth embodiment discussed above, the reinforcing ribs 85, 88 provided on the inside of the pallet constructive members 80a, 80b are constructed to connect the blocks to each other. According to the present invention, however, there is no reason why a layout configuration of the reinforcing ribs 85, 88 is limited to the one described above. In short, all the reinforcing ribs that are to be formed with hollowed portions inside are all connected, and may finally be disposed to be connected to the gas flowing ribs provided in the central block constructive member.

In the synthetic resin pallet P in each embodiment discussed above, the reinforcing ribs 13, 85, 88 provided inwardly of the pallet constructive members 10a, 10b, 20, 30, 40, 50, 60, 70, 80a, 80b, are formed to extend in the directions parallel and orthogonal to the fork entry direction. According to the present invention, however, there is no reason why the extending direction of other reinforcing ribs are limited to the above directions, excluding the solid edge reinforcing ribs 13a formed at the edges of the boards 11a, 11b, 81b along the port areas 14a of the fork entry ports 14.

Further, in the pallet constructive members 10a, 10b, 20, 30, 40, 50, 60, 70, 80a, 80b constituting the synthetic resin pallets in the embodiment discussed above, the surface reinforcing ribs 13b hollowed inside take substantially the square shape in section as shown in FIG. 3. The surface reinforcing ribs 13b illustrated in FIGS. 21, 22, 23 and 24 take an inverse trapezoidal shape in section with tapered side surfaces so that the connecting portions to the boards 11a, 11b, 81a become thick while the tip portions thereof become thin, or with curved side surfaces, or take a semi-circular shape in section. The following is the reason why the hollowed surface reinforcing ribs 13b take the sectional configurations described above.

Namely, the heat tends to stay in the connecting portions between the boards 11a, 11b and the surface reinforcing ribs 13b when molded, resulting a delay in solidification. Hence, there appears such a phenomenon that the boards 11a, 11b, 81a might sink in the configurations of the surface reinforcing ribs 13b. Therefore, the connecting portions of the surface reinforcing ribs 13b to the boards 11a, 11b, 81a are formed to have the largest wall thickness, and the gas is blown into the inner parts thereof when molded, thereby forming the hollowed portions 16 along the surface reinforcing ribs 13b. If thus formed, it is possible to prevent the recesses from being formed in the board surfaces 11a, 11b, 81a.

Figure 21:
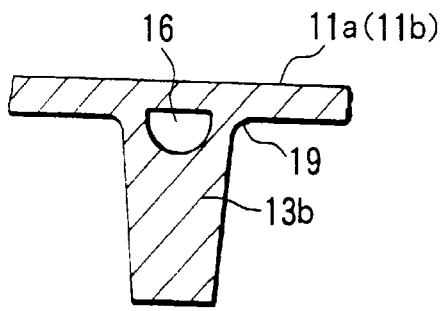
FIG. 21 is a sectional view showing a modified example of the hollowed reinforcing rib illustrated in FIG. 3.
Figure 22:
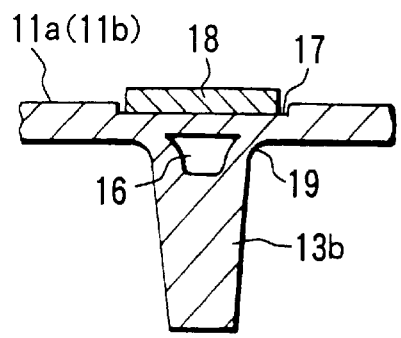
FIG. 22 is a sectional view showing another modified example of the hollowed reinforcing rib illustrated in FIG. 3.
Figure 23:
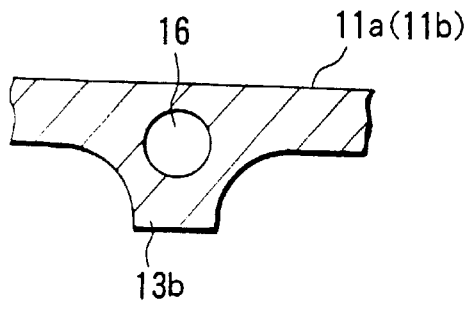
FIG. 23 is a sectional view showing still another modified example of the hollowed reinforcing rib illustrated in FIG. 3.
Figure 24:
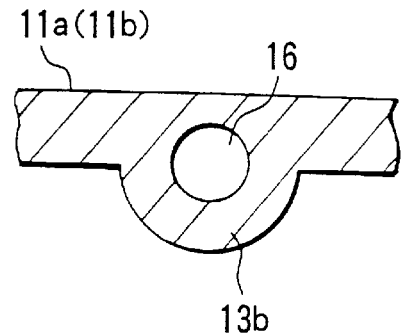
FIG. 24 is a sectional view showing a further modified example of the hollowed reinforcing rib illustrated in FIG. 3.

Further, curved portions 19 are, as shown in FIG. 21 or 22, provided at the maximum-wall-thickness portions of the surface reinforcing ribs 13b in the vicinities of the intersection portions with the boards 11a, 11b, 81a, and a size of each of the hollowed portions 16 can be controlled by adequately designing the size of the curved portions. Thus, it is feasible to activate a flow of the gas and facilitate the formation of the gas passageway by increasing the substantial wall thickness, which involves providing the curved portions 19 as described above. As a result, the gas can be flowed to an intended place.

Incidentally, when manufacturing the synthetic resin pallet, as illustrated in FIG. 22, the boars 11a, 11b, 81a located just above the surface reinforcing ribs 13b are formed with grooves 17, and anti-slip tapes 18 might be disposed in these grooves 17. In such a case also, the surface reinforcing ribs 13b are constructed so that the connecting portions to the boards 11a, 11b, 81a become thick while the tip portions become thin. If thus formed, the recesses can be prevented from being formed in the boards 11a, 11b, 81a just above the surface reinforcing ribs, and therefore parallelism between the anti-slip tape surfaces disposed in the grooves 17 and the boards 11a, 11b, 81a can be maintained. As a result, the function of the slip preventive material 18 can be effective exhibited.

Furthermore, it is desirable that a texture surface be effected on some or entire surfaces of the boards 11a, 11b, 81a of the pallet constructive members 10a, 10b, 20, 30, 40, 50, 60, 70, 80a, 80b. This texture surface is obtained by a mold surface which has inverse patterns given by etching or sand blasting. With this texture surface, the surfaces of the boards 11, 11b, 81a of the pallet constructive members 10a, 10b are roughened, whereby produce serial numbers and a receiver's address are easy to write by a choke etc.

Then, if the surfaces of the boards 11a, 11b, 81a of the pallet constructive members 10a, 10b, 20, 30, 40, 50, 60, 70, 80a are, as explained above, roughened by the texture surface, and if a contact surface of the load mounted on the board during the use of the synthetic resin pallet is similarly rough, the load becomes hard to slip due to engaging action between the rough surfaces, whereby a safeness can be ensured when in use.

As discussed above, according to the synthetic resin pallet of the present invention, the solid edge reinforcing rib is provided at the edge along the port area of the fork entry port that is liable to receive the impact given by the fork, and at least a part of the surface reinforcing rib is hollowed. This configuration makes it feasible to enhance the strength of the reinforcing rib against the impact, which is provided along the periphery of the fork entry port liable to receive the impact while enhancing the flexural strength and reducing the weight of the synthetic resin pallet. The durability of the synthetic resin pallet can be thereby further increased.

Moreover, according to the synthetic resin pallet of the present invention, the comparatively small closed hollowed portions are formed in the inner parts of the edges of the blocks so as to divide the internal space of each block. This construction makes it possible to enhance the strength of the edge portion of the block and the strength of the port area of the fork entry port against the impact while enhancing the flexural strength and reducing the weight of the synthetic resin pallet. The durability of the synthetic resin pallet can be thereby further increased.

Furthermore, according to the synthetic resin pallet of the present invention, when the synthetic resin pallet is manufactured by integrally welding the two pallet constructive members, all the surface reinforcing ribs are connected to the gas flowing ribs in the central block having the closed structure, which is provided at the central portion of the synthetic resin pallet, Then, the gas is flowed to the respective surface reinforcing ribs by introducing the gas into the gas flowing ribs from one point of the central portion of the central block, and the hollowed portions are thus formed in the surface reinforcing ribs, whereby the well-balanced formation of the hollowed portions can be attained.

It is apparent that, in this invention, a wide range of different working modes can be formed based on the invention without deviating from the spirit and scope of the invention. This invention is not restricted by its specific working modes except being limited by the appended claims.

What is claimed is:

1. A synthetic resin pallet comprising:
    a top board;
    a bottom board disposed opposite to said top board;

a plurality of cylindrical blocks for connecting said two boards; and a fork entry port formed between said blocks, wherein said synthetic resin pallet is manufactured by making one pallet constructive member and another pallet constructive member face to each other, said one pallet constructive member including said board and cylindrical block constructive members integrally formed on the inside of said board, said another pallet constructive member including said board and block constructive member integrally formed on the inside of said board, and by integrally welding said block constructive members, reinforcing ribs are formed lengthwise and crosswise on the inside of the surface of at least said one pallet constructive member, and said reinforcing ribs include surface reinforcing ribs formed lengthwise and crosswise on the inside of the surface of said synthetic resin pallet, and hollowed portions are formed in inner parts of at least some of said surface reinforcing ribs.

2. A synthetic resin pallet according to claim 1, wherein said hollowed portions are formed in the inner parts of all of said surface reinforcing ribs.

3. A synthetic resin pallet according to claim 1, wherein said surface reinforcing ribs extending in a direction orthogonal to a longitudinal direction of said fork entry port are hollowed, and said surface reinforcing ribs parallel to the longitudinal direction of said fork entry port are solid.

4. A synthetic resin pallet according to claim 1, wherein said reinforcing rib further includes a solid edge reinforcing rib formed along an edge of the port area of said fork entry port of said synthetic resin pallet.

5. A synthetic resin pallet according to claim 4, wherein said solid edge reinforcing rib is connected to said hollowed surface reinforcing rib adjacently provided along said solid edge reinforcing rib trough a plurality of solid connection ribs disposed at a predetermined interval.

6. A synthetic rein pallet according to claim 1, wherein said plurality of blocks are provided at the central portion of said synthetic resin pallet and are constructed of a central block formed with a closed space in its interior and peripheral blocs provided at a predetermined interval along the periphery of said central block, the interior of said central block is formed with gas flowing ribs formed radially from the central portion, and said hollowed portion is formed in said reinforcing rib by blowing the gas from inside of said central block constructive member which will become said central block and flowing the gas into said comparatively thick surface reinforcing rib provided in said pallet constructive member through said gas flowing rib when molding said pallet constructive member.

7. A synthetic resin pallet according to claim 6, wherein said surface reinforcing rib is provided respectively between said peripheral blocks, and between said central block and said peripheral blocks located in lengthwise and crosswise directions, and said surface reinforcing rib connected to said central block is connected to said gas flowing rib within said central block through a wall portion of said central block.

8. A synthetic resin pallet according to claim 7, wherein said synthetic resin pallet is a four-way pallet and has said one central block and eight pieces of said peripheral blocks arrayed lengthwise and crosswise along the periphery of said central block, and said surface reinforcing rib is formed in a position substantially inscribed in four pieces of said blocks when looking at a one-fourth area of said synthetic resin pallet that is divided by a lengthwise central line and a crosswise central line which pass though the center of said central block.

9. A synthetic resin pallet according to claim, wherein said hollowed surface reinforcing rib is formed in such a sectional configuration as to be thicker toward said board and thinner toward a tip portion, and an interior of a largest-wall-thickness portion of said surface reinforcing rib in the vicinity of a connecting portion to said board is formed with said hollowed portion along said surface reinforcing rib.

10. A synthetic resin pallet according to claim 9, wherein said board just above said hollowed surface reinforcing rib is formed with a groove substantially along said surface reinforcing rib, and a slip preventive material is disposed in said groove.

11. A synthetic resin pallet according to claim 9 or 10, wherein said reinforcing rib is provided with a curved portion at the largest-wall-thickness portion in the vicinity of an intersecting portion with said board, and a size of said hollowed portion is controlled by a size of said curved portion.

12. A synthetic resin pallet according to claim 1, wherein a width of said hollowed surface reinforcing rib is 5–40 mm.

13. A synthetic resin pallet according to claim 12, wherein a width of said solid surface reinforcing rib is smaller than a width of said hollowed surface reinforcing rib.

14. A synthetic resin pallet according to claim 13, wherein the width of said solid surface reinforcing rib is 3–7 mm.

15. A synthetic resin pallet according to claim 1, wherein said block in said synthetic resin pallet is constructed so as to include a comparatively small closed spatial portion for dividing the internal space of said block in an interior of the edge portion adjacent to the port area of said fork entry port.

16. A synthetic resin pallet according to claim 15, wherein a partition wall for forming said closed spatial portion within the edge portion of said block is constructed of a first partitioning portion formed between side walls of said block in the longitudinal direction of said fork entry prot, and at least one second partitioning portion parallel to said fork entry port in order to subdivide a spatial portion defined by said first partitioning portion and edge walls of said block.

17. A synthetic resin pallet according to claim 15, wherein a partition wall for forming said closed spatial portion within the edge portion of said block is constructed of a first partitioning portion formed between side walls of said block in the longitudinal direction of said fork entry port, and at least one second partitioning portion formed at an angle a to the longitudinal direction of said fork entry port in order to subdivide a spatial portion defined by said first partitioning portion and side walls of said block, and the angle $\alpha$ falls within a range of $0° < \alpha < 90°$.

18. A synthetic resin pallet according to any one of claims 15–17, wherein a thickness of said board in said closed spatial portion located at a corner of said synthetic resin pallet is set larger than thicknesses of other portions of said board.

19. A synthetic resin pallet according to any one of claims 15–17, wherein lengthwise and crosswise dimensions of said closed spatial portion located at the corner of said synthetic resin pallet within said block are each 30–80 mm.

20. A synthetic resin pallet according to claim 1, wherein a wall thickness of said block is approximately 3 mm–7 mm.

21. A synthetic resin pallet according to claim 1, wherein a crimping process is effected on a part of surface or an entire surface of said board in said pallet constructive member.

22. A synthetic resin pallet according to claim 1, wherein said fork entry port of said pallet constructive member is provided with a grommet fitted for preventing a slip between a pallet and fork tines in a position spaced less than 200 mm away from the edge of said board.

23. A synthetic resin pallet according to claim 1, wherein said synthetic resin pallet is a two-way pallet.

24. A synthetic resin pallet according to claim 1, wherein said synthetic resin pallet is a four-way pallet.

* * * * *